(12) United States Patent
Goshozono et al.

(10) Patent No.: US 12,037,510 B2
(45) Date of Patent: Jul. 16, 2024

(54) AQUEOUS COATING MATERIAL COMPOSITION AND METHOD FOR FORMING MULTILAYER COATING FILM

(71) Applicant: KANSAI PAINT CO., LTD., Amagasaki (JP)

(72) Inventors: Yuri Goshozono, Hiratsuka (JP); Toru Tsuji, Hiratsuka (JP); Tomoya Murakami, Hiratsuka (JP); Narihito Nakano, Hiratsuka (JP)

(73) Assignee: KANSAI PAINT CO., LTD., Amagasaki (JP)

( * ) Notice: Subject to any disclaimer, the term of this patent is extended or adjusted under 35 U.S.C. 154(b) by 163 days.

(21) Appl. No.: 17/440,669

(22) PCT Filed: Mar. 23, 2020

(86) PCT No.: PCT/JP2020/012636
§ 371 (c)(1),
(2) Date: Sep. 17, 2021

(87) PCT Pub. No.: WO2020/203397
PCT Pub. Date: Oct. 8, 2020

(65) Prior Publication Data
US 2022/0154035 A1    May 19, 2022

(30) Foreign Application Priority Data

Mar. 29, 2019   (JP) .................................. 2019-065414

(51) Int. Cl.
*C08L 67/00* (2006.01)
*B05D 5/06* (2006.01)
(Continued)

(52) U.S. Cl.
CPC ......... *C09D 151/003* (2013.01); *B05D 5/068* (2013.01); *B05D 7/14* (2013.01); *B05D 7/5723* (2013.01); *C08F 212/08* (2013.01); *C08F 220/06* (2013.01); *C08F 220/14* (2013.01); *C08F 220/1802* (2020.02); *C08F 220/1804* (2020.02); *C08F 220/20* (2013.01); *C08F 220/40* (2013.01); *C08F 265/06* (2013.01); *C08G 18/80* (2013.01); *C08G 63/183* (2013.01); *C08G 63/668* (2013.01); *C08K 3/08* (2013.01); *C08K 5/34922* (2013.01); *C08L 71/02* (2013.01); *C08L 75/04* (2013.01); *C09D 167/025* (2013.01); *B05D 2425/01* (2013.01); *B05D 2425/02* (2013.01); *B05D 2425/03* (2013.01); *B05D 2425/04* (2013.01); *B05D 2502/00* (2013.01); *B05D 2508/00* (2013.01); *B05D 2601/08* (2013.01); (Continued)

(58) Field of Classification Search
CPC ...... C09D 151/003; C09D 5/024; C09D 7/41; C09D 7/65; C09D 167/025; B05D 5/068; B05D 7/14; B05D 7/5723; B05D 2425/01; B05D 2425/02; B05D 2425/03; B05D 2425/04; B05D 2502/00; B05D 2508/00; B05D 2601/08; B05D 1/04; B05D 2350/10; B05D 2401/20; B05D 2503/00; B05D 5/066; B05D 7/532; B05D 7/57; C08G 63/668; C08G 2150/00; C08G 18/80; C08G 63/183; C08K 3/08; C08K 5/34922; C08K 2003/0812; C08L 71/02; C08L 75/04; C08L 2207/53; C08F 212/08; C08F 220/06; C08F 220/14; C08F 220/1802; C08F 220/1804; C08F 220/20; C08F 220/40; C08F 265/06
USPC ........................................................ 524/504
See application file for complete search history.

(56) References Cited

U.S. PATENT DOCUMENTS

2004/0241484 A1* 12/2004 Uchida ................ C09D 133/08
428/522
2006/0135678 A1   6/2006 Kato et al.
(Continued)

FOREIGN PATENT DOCUMENTS

CN         1968988 A        5/2007
CN       108368244 A        8/2018
(Continued)

OTHER PUBLICATIONS

International Search Report (ISR) mailed Jun. 9, 2020, issued for International application No. PCT/JP2020/012636. (3 pages).
(Continued)

*Primary Examiner* — Hannah J Pak
(74) *Attorney, Agent, or Firm* — Law Office of Katsuhiro Arai

(57) ABSTRACT

An object is to provide an aqueous coating material composition having high viscosity expression property as well as a viscosity property of decreasing viscosity with increase in shear velocity; in particular, to provide an aqueous coating material composition that can form a multilayer coating film having excellent smoothness, clarity, flip-flop property, adhesion, and water resistance; in addition, to provide a method for forming a multilayer coating film using such aqueous coating material composition, as well as a coated article that has been coated with such aqueous coating material composition. As a solution, an aqueous coating material composition is provided that contains a polyester resin (A), acrylic resin particles (B), a curing agent (C), and a coloring pigment (D), wherein the polyester resin (A) is a resin containing a trifunctional or higher polyfunctional polycarboxylic acid (a1) and a polyol (a2) as monomer components.

4 Claims, No Drawings

(51) Int. Cl.
  *B05D 7/00*    (2006.01)
  *B05D 7/14*    (2006.01)
  *C08F 212/08*  (2006.01)
  *C08F 220/06*  (2006.01)
  *C08F 220/14*  (2006.01)
  *C08F 220/18*  (2006.01)
  *C08F 220/20*  (2006.01)
  *C08F 220/40*  (2006.01)
  *C08F 265/06*  (2006.01)
  *C08G 18/80*   (2006.01)
  *C08G 63/183*  (2006.01)
  *C08G 63/668*  (2006.01)
  *C08K 3/08*    (2006.01)
  *C08K 5/3492*  (2006.01)
  *C08L 71/02*   (2006.01)
  *C08L 75/04*   (2006.01)
  *C09D 151/00*  (2006.01)
  *C09D 167/02*  (2006.01)

(52) U.S. Cl.
  CPC .. *C08G 2150/00* (2013.01); *C08K 2003/0812* (2013.01); *C08L 2207/53* (2013.01)

(56) References Cited

U.S. PATENT DOCUMENTS

| | | | |
|---|---|---|---|
| 2009/0197094 A1 | 8/2009 | Nakahara et al. | |
| 2014/0316042 A1* | 10/2014 | Kamikuri | C09D 167/02 524/377 |
| 2014/0318433 A1* | 10/2014 | Dunford | C09D 5/14 114/67 R |
| 2015/0232693 A1* | 8/2015 | Ishikura | B05D 7/572 428/423.1 |
| 2016/0017175 A1* | 1/2016 | Colyer | C09D 167/00 528/297 |
| 2017/0275494 A1* | 9/2017 | Jahns | C08G 18/283 |
| 2018/0362798 A1 | 12/2018 | Steinmetz et al. | |

FOREIGN PATENT DOCUMENTS

| | | |
|---|---|---|
| JP | S5922970 A | 2/1984 |
| JP | 2000001662 A | 1/2000 |
| JP | 2002069430 A | 3/2002 |
| JP | 2002153806 A | 5/2002 |
| JP | 2003225610 A | 8/2003 |
| JP | 2006131695 A | 5/2006 |
| JP | 2006169396 A | 6/2006 |
| JP | 2007297545 A | 11/2007 |
| JP | 2008144064 A | 6/2008 |
| JP | 2011131135 A | 7/2011 |
| WO | 2005121209 A1 | 12/2005 |
| WO | 2008072489 A1 | 6/2008 |
| WO | 2017097638 A1 | 6/2017 |

OTHER PUBLICATIONS

Extended European Search Report (EESR) dated Nov. 17, 2022, issued for European counterpart patent application No. EP20781963.2 (6 pages).
A Second Office Action issued by the State Intellectual Property Office of China on Mar. 20, 2023, for Chinese Counterpart application No. 202080022813.4 (9 pages).
A First Office Action issued by the State Intellectual Property Office of China on Jul. 26, 2022, for Chinese counterpart application No. 202080022813.4 (11 pages).
Industrial Patent Analysis Report, vol. 45, High Performance Automotive Paint, Yang Tiejun, p. 234, No. 19, Intellectual Property Rights Edition, Jun. 2016 (3 pages).

\* cited by examiner

AQUEOUS COATING MATERIAL COMPOSITION AND METHOD FOR FORMING MULTILAYER COATING FILM

CROSS-REFERENCE TO RELATED APPLICATIONS

This application is the U.S. National Phase under 35 U.S.C. § 371 of International Application PCT/JP2020/012636, filed Mar. 23, 2020, which claims priority to Japanese Patent Application No. JP2019-065414, filed Mar. 29, 2019. The International Application was published under PCT Article 21(2) in a language other than English.

TECHNICAL FIELD

The present invention relates to an aqueous coating material composition containing a polyester resin, acrylic resin particles, a curing agent, and a coloring pigment, as well as a method for forming a multilayer coating film.

BACKGROUND ART

When coating automotive bodies, automotive components, and other target objects that require excellent appearance, generally methods of applying an atomized coating material are used from the viewpoints of appearance of the coating film to be formed, production efficiency, etc. These coating methods specifically include spray coating, rotational atomization coating, etc., for example.

When a coating material is to be atomized and then applied, preferably the coating material used is low in viscosity when sprayed, rotationally atomized or otherwise atomized so as to allow for formation of smaller coating material particles, as this helps form a coating film having excellent smoothness. On the other hand, preferably the coating material will have relatively high viscosity once it adheres to the target object, because, this way, a coating film will be formed that has excellent clarity and is resistant to layer mixing with the coating material(s) applied as the top layer and/or bottom layer, and furthermore such coating film will not drip easily on the vertical faces of the target object. Also, when the aforementioned coating material is a photoluminescent base coat containing an aluminum pigment or other photoluminescent pigment, the photoluminescent pigment will move less in the coating material and thus its orientation will be disturbed less if the coating material has higher viscosity after adhering to the target object, the result of which is that a coating film having excellent photoluminescence can be formed. It should be noted that a "coating film having excellent photoluminescence" refers to a coating film that, when observed at different angles, presents marked changes in brightness according to the angle of observation, while being virtually free from metallic mottling because the photoluminescent pigment exists relatively evenly throughout the coating film. Also, when the brightness of the coating film changes markedly according to the angle of observation, as described above, such coating film is generally described as having high flip-flop property.

For the reasons mentioned above, preferably the coating material is low in viscosity when subject to high shear velocities such as during atomization, but demonstrates high viscosity when the coating material is in a stationary or adhered state where it is subject to low shear velocities, because, this way, a coating film can be formed that is storable (in terms of pigment sedimentation property, color separation property, etc.) and has excellent appearance. In other words, preferably the coating material is such that its viscosity decreases under increasing shear velocities.

Lately the 3-coat-1-bake method comprising a sequence of primer (middle coat) application→base coat application-→clear coat application→heating/curing, the 2-coat-1-bake method comprising a sequence of base coat application clear coat application→heating/curing, and more recently 4-coat-1-bake, are being studied (a preheating step may be inserted following the application of coating materials).

In particular demand are the 3-coat-1-bake method and 2-coat-1-bake method that use aqueous coating materials as the primer and/or base coat, from the viewpoint of preventing environmental pollution caused by volatilization of organic solvents.

However, use of the aforementioned 3-coat-1-bake method or 2-coat-1-bake method presents a challenge in that the smoothness, clarity, and flip-flop property of the formed coating film may drop due to layer mixing occurring between the aqueous base coat and primer layers and/or between the aqueous base coat and clear coat layers.

Means for preventing layer mixing involving the aforementioned aqueous base coat by increasing its viscosity under low shear velocities after adhesion, include a method of compounding an association-type viscosity-adjusting agent in the coating material. Association-type viscosity-adjusting agent is generally a viscosity-adjusting agent having a hydrophilic part and a hydrophobic part in one molecule so that, in an aqueous coating material, its hydrophilic parts contribute to stability in the aqueous solution, while hydrophobic parts are adsorbed to the pigment or acrylic emulsion particles compounded in the aqueous coating material or become associated with each other to form a net-like structure, thus effectively demonstrating a thickening action. Also, preferably the acrylic emulsion particles contain relatively-hydrophobic monomers in order to increase the thickening effect of association.

The aforementioned association-type viscosity-adjusting agent normally forms a net-like structure through a hydrophobic interaction, to express viscosity. If a large shear force is applied, on the other hand, the hydrophobic interaction and net-like structure will collapse, and the viscosity will drop. This means that any aqueous coating material containing the association-type viscosity-adjusting agent possesses a viscosity property of decreasing viscosity with increase in shear velocity.

In general, the aforementioned aqueous base coat may contain a surfactant to disperse a hydrophobic resin component in water. Also, if it contains any water-soluble resin, additive, or pigment dispersion paste, the hydrophilic organic solvent contained therein may be introduced to the aqueous coating material.

However, use of an association-type viscosity-adjusting agent in the aforementioned aqueous base coat containing a surfactant and/or hydrophilic organic solvent presents a challenge in that the expression of viscosity by the association-type viscosity-adjusting agent is reduced, and the smoothness, clarity, and flip-flop property of the formed coating film may drop. Specifically, when the aqueous base coat is low in viscosity in an adhered state on the target object, layer mixing may occur between it and the coating material(s) applied as the top layer and/or bottom layer to reduce the smoothness and clarity of the formed coating film, and if the aqueous coating material contains a photoluminescent pigment, the photoluminescent pigment in the coating material may move after the coating material has adhered, resulting in an irregular orientation of the photoluminescent pigment and consequent drop in the flip-flop property or occurrence of metallic mottling. If, on the other hand, the content of the association-type viscosity-adjusting agent in the aqueous coating material is to be increased in order to raise its viscosity in an adhered state, the viscosity under high shear velocities will also rise and the coating material particles resulting from atomization of the coating material will increase, which may lead to inferior smoothness of the formed coating film.

Patent Literature 1 describes that a viscosity controlling agent having hydrophobic parts and hydrophilic parts obtained by hydrophobically modifying a hydrophilic polymer and/or hydrophilically modifying a hydrophobic polymer, can reduce the concentration dependence of the viscosity of an aqueous dispersion. It is further described that an aqueous coating material using the viscosity controlling agent demonstrates stable flow property despite varying application conditions, especially temperature/humidity conditions, so that a coating film with good finish can be obtained in a stable manner. However, the viscosity controlling agent may lead to insufficient expression of viscosity. Particularly when the viscosity controlling agent is used in a coating material containing a surfactant and/or hydrophilic organic solvent, there is a tendency that sufficient viscosity cannot be obtained, and the clarity and flip-flop property of the formed coating film will drop, or metallic mottling will occur.

Patent Literature 2 describes that a urethane-based viscosity-adjusting agent having a specific structure provides a thickening/viscosity-adjusting agent demonstrating excellent thickening property and thixotropic property. It should be noted that "thixotropic property" refers to the aforementioned viscosity property of decreasing viscosity with increase in shear velocity. However, the urethane-based viscosity-adjusting agent may lead to insufficient expression of viscosity. Particularly when the urethane-based viscosity-adjusting agent is used in a coating material containing a surfactant and/or hydrophilic organic solvent, there is a tendency that sufficient viscosity cannot be obtained, and the clarity and flip-flop property of the formed coating film will drop, or metallic mottling will occur.

Patent Literature 3 describes a 3-coat-1-bake coating film formation method of forming a middle coating film, a base coating film, and a clear coating film, wet-on-wet in sequence on a base material, wherein the coating film formation method is such that the middle coat with which to form the middle coating film, and the base coat with which to form the base coating film, each contain an amide group-containing acrylic resin and a crosslinking agent, where the crosslinking agent contained in the middle coat comprises an aliphatic isocyanate-based active methylene block isocyanate. It is described that, when the aliphatic isocyanate-based active methylene block isocyanate, or crosslinking agent, has an average functional group number of 3 or greater, a viscosity controlling effect will manifest due to the amide group-containing acrylic resin, to control conformability and inversion at the interface of each pair of coating films applied under the 3-coat-1-bake method. It is further described that, since the curing of the middle coating film starts before the base coating film and clear coating film, sufficient flow property can be ensured and excellent base concealability is achieved for the surface roughness of any electrodeposition coating film, so that a multilayer coating film having excellent finish and appearance as well as excellent coating film properties, especially chipping resistance, can be obtained. However, the poor storage stability of the active methylene block isocyanate in the coating material may lead to reduced smoothness and clarity, or it may cause the adhesion and water resistance to drop due to insufficient curing.

Patent Literature 4 describes a second aqueous coating material for use in forming a multilayer coating film through application of a first aqueous coating material, the second aqueous coating material, and a clear coat, wet-on-wet in sequence on a base material, wherein the second aqueous coating material contains: (a) an emulsion comprising a copolymer of vinyl-polymerizable monomers including polyfunctional vinyl monomers, (b) an amide group-containing water-soluble acrylic resin, (c) a urethane emulsion, and (d) a crosslinking agent. Due to the crosslinked structures in the emulsion particles, this coating material, even though applied wet-on-wet, will prevent the clear coat component from infiltrating the bottom layer coating film, thereby controlling layer mixing with the top layer coating film. As a result, reportedly a lower-energy multilayer coating film having excellent appearance and water resistance can be obtained. Also, it is described that the second aqueous coating material also demonstrates excellent storage stability as it contains (b) the amide group-containing water-soluble acrylic resin, (c) urethane emulsion, and (d) crosslinking agent. However, the smoothness, clarity, and flip-flop property of the formed coating film may drop due to layer mixing occurring between the middle coat and aqueous base coat and/or between the aqueous base coat and clear coat, and at lower heating temperatures the water resistance may drop due to insufficient curing.

BACKGROUND ART LITERATURE

Patent Literature

Patent Literature 1: Japanese Patent Laid-open No. 2000-1662
Patent Literature 2: Japanese Patent Laid-open No. 2002-69430
Patent Literature 3: Japanese Patent Laid-open No. 2002-153806
Patent Literature 4: Japanese Patent Laid-open No. 2007-297545

SUMMARY OF THE INVENTION

Problems to Be Solved by the Invention

An object of the present invention is to provide an aqueous coating material composition having high viscosity expression property as well as a viscosity property of decreasing viscosity with increase in shear velocity; in particular, to provide an aqueous coating material composition that can form a multilayer coating film having excellent smoothness, clarity, flip-flop property, adhesion, and water resistance; in addition, to provide a method for forming a multilayer coating film using such aqueous coating material composition, as well as a coated article that has been coated with such aqueous coating material composition.

Means for Solving the Problems

As a result of conducting multiple studies in earnest to achieve the aforementioned object, the inventors of the present invention found that, when an aqueous coating material composition containing a polyester resin (A), acrylic resin particles (B), a curing agent (C), and a coloring pigment (D) is applied as at least one layer of a multilayer coating film comprising two or more layers, and all layers are heated and cured at the same time to form a multilayer coating film, wherein the aqueous coating material composition is characterized in that the polyester resin (A) contains a trifunctional or higher polyfunctional polycarboxylic acid (a1) and a polyol (a2) as monomer components, a multilayer coating film having excellent smoothness, clarity, flip-flop property, adhesion, and water resistance can be formed.

In other words, the present invention provides the following aqueous coating material composition containing a polyester resin, acrylic resin particles, a curing agent, and a coloring agent; method for forming a multilayer coating film using such aqueous coating material composition; and method for manufacturing a coated article that has been coated with such aqueous coating material composition.

Item 1. An aqueous coating material composition containing a polyester resin (A), acrylic resin particles (B), a curing agent (C), and a coloring pigment (D), wherein the aqueous coating material composition is characterized in that the polyester resin (A) is a resin containing a trifunctional or higher polyfunctional polycarboxylic acid (a1) and a polyol (a2) as monomer components.

Item 2. The aqueous coating material composition according to Item 1 above, characterized in that the polyol (a2) is a polyalkylene glycol expressed by Formula (1) below:

$$HO-(X-O-)n-H \qquad (1)$$

(In the formula, X is a straight-chain or branched hydrocarbon group with 2 or more carbon atoms, while n is a value of 2 or greater.)

Item 3. The aqueous coating material composition according to Item 1 or 2 above, characterized in that the acrylic resin particles (B) are core-shell type acrylic resin particles (B1) each having a core part and a shell part, wherein the ratio of core parts and shell parts falls in a range of 50/50 to 90/10 based on the total quantity of monomer components, and the core parts contain, relative to the total quantity of monomer components of the core parts, 1 to 10% by mass of polymerizable unsaturated monomers having two or more polymerizable unsaturated groups in one molecule.

Item 4. The aqueous coating material composition according to any one of Items 1 to 3 above, characterized in that the curing agent (C) is an amino resin and/or block polyisocyanate compound.

Item 5. The aqueous coating material composition according to any one of Items 1 to 4 above, characterized in that the coloring pigment (D) contains a photoluminescent pigment.

Item 6. The aqueous coating material composition according to any one of Items 1 to 5 above, characterized in that it further contains a urethane resin (E).

Item 7. The aqueous coating material composition according to any one of Items 1 to 6 above, characterized in that it further contains a polyether polyol (F).

Item 8. A method for forming a coating film, characterized in that the aqueous coating material composition according to any one of Items 1 to 7 above is applied on a target object to form a colored coating film.

Item 9. A method for forming a multilayer coating film comprising steps (I) to (IV) below performed on a target object:
step (I) being a step in which a first colored aqueous coating material is applied to form a first colored coating film;
step (II) being a step in which a second colored aqueous coating material is applied on the cured or uncured first colored coating film formed in step (I) above, to form a second colored coating film;
step (III) being a step in which a clear coat is applied on the uncured second colored coating film formed in step (II) above, to form a clear coating film; and
step (IV) being a step in which the multilayer coating film formed through steps (I) to (III) above is baked and cured;
wherein the method for forming a multilayer coating film is characterized in that the first colored aqueous coating material is an aqueous coating material composition containing a polyester resin (A), acrylic resin particles (B), a curing agent (C), and a coloring pigment (D), and the polyester resin (A) is a resin containing a trifunctional or higher polyfunctional polycarboxylic acid (a1) and a polyol (a2) as monomer components.

Item 10. A method for forming a multilayer coating film comprising steps (I) to (IV) below performed on a target object:
step (I) being a step in which a first colored aqueous coating material is applied to form a first colored coating film;
step (II) being a step in which a second colored aqueous coating material is applied on the cured or uncured first colored coating film formed in step (I) above, to form a second colored coating film;
step (III) being a step in which a clear coat is applied on the uncured second colored coating film formed in step (II) above, to form a clear coating film; and
step (IV) being a step in which the multilayer coating film formed through steps (I) to (III) above is baked and cured;
wherein the method for forming a multilayer coating film is characterized in that the second colored aqueous coating material is an aqueous coating material composition containing a polyester resin (A), acrylic resin particles (B), a curing agent (C), and a coloring pigment (D), and the polyester resin (A) is a resin containing a trifunctional or higher polyfunctional polycarboxylic acid (a1) and a polyol (a2) as monomer components.

Item 11. A method for forming a multilayer coating film comprising steps (I) to (III) below performed on a target object:
step (I) being a step in which a colored aqueous coating material is applied to form a colored coating film;
step (II) being a step in which a clear coat is applied on the uncured colored coating film formed in step (I) above, to form a clear coating film; and
step (III) being a step in which the multilayer coating film formed through steps (I) and (II) above is baked and cured;
wherein the method for forming a multilayer coating film is characterized in that the colored aqueous coating material is an aqueous coating material composition containing a polyester resin (A), acrylic resin particles (B), a curing agent (C), and a coloring pigment (D), and the polyester resin (A) is a resin containing a trifunctional or higher polyfunctional polycarboxylic acid (a1) and a polyol (a2) as monomer components.

Item 12: A method for forming a multilayer coating film comprising steps (I) to (V) below performed on a target object:
step (I) being a step in which a first colored aqueous coating material is applied to form a first colored coating film;

step (II) being a step in which a second colored aqueous coating material is applied on the cured or uncured first colored coating film formed in step (I) above, to form a second colored coating film;

step (III) being a step in which a third colored aqueous coating material is applied on the uncured second colored coating film formed in step (II) above, to form a third colored coating film;

step (IV) being a step in which a clear coat is applied on the uncured third colored coating film formed in step (III) above, to form a clear coating film; and step (V) being a step in which the multilayer coating film formed through steps (I) to (IV) above is baked and cured;

wherein the method for forming a multilayer coating film is characterized in that the first colored aqueous coating material, second colored aqueous coating material, and/or third colored aqueous coating material is/are each an aqueous coating material composition containing a polyester resin (A), acrylic resin particles (B), a curing agent (C), and a coloring pigment (D), and the polyester resin (A) is a resin containing a trifunctional or higher polyfunctional polycarboxylic acid (a1) and a polyol (a2) as monomer components.

Item 13. A method for manufacturing a coated article using the method for forming a coating film according to any one of Items 8 to 12 above.

Effects of the Invention

The aqueous coating material composition proposed by the present invention has high viscosity expression property as well as a viscosity property of decreasing viscosity with increase in shear velocity. Particularly when such aqueous coating material composition is applied as at least one layer of a multilayer coating film comprising two to four layers, and all layers are baked and cured at the same time to form a multilayer coating film, a multilayer coating film having excellent smoothness, clarity, flip-flop property, adhesion, and water resistance can be formed.

MODE FOR CARRYING OUT THE INVENTION

The aqueous coating material composition and method for forming a multilayer coating film, as proposed by the present invention, are explained in detail below.

It should be noted that, in this Specification, "a resin contains monomer X representing a material thereof" means that, unless a contradicting statement appears elsewhere, the resin is a (co)polymer of material monomers including the monomer X. Also, in this Specification, "(co)polymer" refers to polymer or copolymer.

Aqueous Coating Material Composition

The aqueous coating material composition proposed by the present invention contains a polyester resin (A), acrylic resin particles (B), a curing agent (C), and a coloring pigment (D).

Polyester Resin (A)

A polyester resin (A) that may be used in the aqueous coating material composition proposed by the present invention may be manufactured from monomer components including a polycarboxylic acid component containing a trifunctional or higher polyfunctional polycarboxylic acid (a1) and a polyol (a2), through an esterification reaction or ester exchange reaction of the polycarboxylic acid component and polyol component.

As part of the polycarboxylic acid component representing a material of the polyester resin (A), any polycarboxylic acid component other than the trifunctional or higher polyfunctional polycarboxylic acid (a1) (bifunctional polycarboxylic acid) may be contained. The content of the trifunctional or higher polyfunctional polycarboxylic acid (a1) is preferably 50% by mol or higher, or more preferably 70% by mol or higher, or yet more preferably 90% by mol or higher, or most preferably 100% by mol, relative to the total quantity of the polycarboxylic acid component.

As for the ratio of the trifunctional or higher polyfunctional polycarboxylic acid (a1) and the polyol (a2), the content of the trifunctional or higher polyfunctional polycarboxylic acid (a1) relative to the total quantity of (a1) and (a2) is preferably lower than 50% by mol but no lower than 1% by mol, or preferably lower than 35% by mol but no lower than 5% by mol, or preferably lower than 20% by mol but no lower than 10% by mol.

For the aforementioned trifunctional or higher polyfunctional polycarboxylic acid (a1), any compound having three or more carboxyl groups in one molecule may be suitably used. Specific examples include, for example: trimellitic acid, pyromellitic acid, benzophenone tetracarboxylic acid, trimesic acid, ethylene glycol bistrimellitate, glycerol tristrimellitate, 1,2,3,4-butane tetracarboxylic acid, 1,4,5,8-naphthalene tetracarboxylic acid and other polycarboxylic acids; anhydrides of these polycarboxylic acids; halides of these polycarboxylic acids; and lower alkyl esterified products of these polycarboxylic acids, any one of which may be used alone or two or more types may be mixed.

Among these, use of at least one type selected from tricarboxylic acid compounds as well as halides thereof and lower alkyl esterified products thereof is preferred, while use of at least one type selected from trimellitic acid, trimesic acid, anhydrides of these acids, halides of these acids, and lower alkyl (alkyl with 6 or fewer carbon atoms) esterified products of these acids is more preferred. In particular, use of at least one type selected from trimellitic acid, anhydride of trimellitic acid, halide of trimellitic acid, and lower alkyl esterified product of trimellitic acid is most preferred from an economic viewpoint (raw material costs).

Specific examples of bifunctional polycarboxylic acids include, for example: phthalic acid, isophthalic acid, terephthalic acid, succinic acid, glutaric acid, adipic acid, azelaic acid, sebacic acid, tetrahydrophthalic acid, hexahydrophthalic acid, maleic acid, fumaric acid, itaconic acid, and other dicarboxylic acids; anhydrides of these dicarboxylic acids; halides of these dicarboxylic acids; and lower alkyl esterified products of these dicarboxylic acids, any one of which may be used alone or two or more types may be mixed.

As bifunctional polycarboxylic acids, preferably hydrophobic compounds of relatively high molecular weights (molecular weights of 200 or greater) are not used, and particularly dimer acids are not used, from the viewpoint of hydrophilicity. Also, preferably the polyester resin (A) under the present invention does not effectively contain any bifunctional polycarboxylic acid.

Also, for the aforementioned polyol (a2), any compound having two or more hydroxyl groups in one molecule may be suitably used. Specific examples include, for example: ethylene glycol, 1,2-propylene glycol, 1,2-butylene glycol, 2,3-butylene glycol, 1,2-hexanediol, 1,2-dihydroxycyclohexane, 3-ethoxypropane-1,2-diol, 3-phenoxypropane-1,2-diol, and other α-glycols; polyalkylene glycol; neopentyl glycol, 2-methyl-1,3-propanediol, 2-methyl-2,4-pentanediol, 3-methyl-1,3-butanediol, 2-ethyl-1,3-hexanediol, 2,2-diethyl-1,3-propanediol, 2,2,4-trimethyl-1,3-pentanediol, 2-butyl-2-ethyl-1,3-propanediol, 2-phenoxypropane-1,3-diol, 2-methyl-2-phenylpropane-1,3-diol, 1,3-propylene glycol, 1,3-butylene glycol, 2-ethyl-1,3-octanediol, 1,3-dihydroxycyclohexane, 1,4-butanediol, 1,4-dihydroxycyclohexane, 1,5-pentanediol, 1,6-hexanediol, 2,5-hexanediol, 3-methyl-1,5-pentanediol, 1,4-dimethylol cyclohexane, tricyclodecanedimethanol, 2,2-dimethyl-3-hydroxypropyl-2,2-dimethyl-3-hydroxypropionate (this is an esterified product of hydroxypivalic acid and neopentyl glycol), bisphenol A, bisphenol F, bis(4-hydroxyhexyl)-2,2-propane, bis(4-hydroxyhexyl)methane, 3,9-bis(1,1-dimethyl-2-hydroxyethyl)-2,4,8,10-tetraoxaspiro[5,5]undecane, diethylene glycol, triethylene glycol, glycerin, diglycerin, triglycerin, pentaerythritol, dipentaerythritol, sorbitol, mannite, trimethylolethane, trimethylolpropane, ditrimethylolpropane, and tris(2-hydroxyethyl)isocyanurate. Any one of these may be used alone or two or more types may be mixed.

Also, for the polyol (a2), any polyol having functional groups, such as dihydroxycarboxylic acid, may be contained. Under the present invention, preferably dihydroxycarboxylic acid is not used from the viewpoint of the properties of the polyester to be obtained, for example.

In particular, preferably the aforementioned polyol (a2) contains a polyalkylene glycol (a2-1) expressed by Formula (1) below, in order to add hydrophilicity to the skeletal center of the polyester resin (A) and thereby increase its stability in an aqueous medium:

$$HO-(X-O-)_n-H \quad (1)$$

(In the formula, X is a straight-chain or branched hydrocarbon group with 2 or more carbon atoms, while n is a value of 2 or greater.)

X in the aforementioned formula is normally a straight-chain or branched hydrocarbon group with 2 or more carbon atoms, or preferably a hydrocarbon group with 3 or 4 carbon atoms, or more preferably a hydrocarbon group with 4 carbon atoms, from the viewpoint of balancing hydrophilicity, water resistance, etc. The weight-average molecular weight of the aforementioned polyalkylene glycol (a2-1) is such that, from the viewpoint of balancing hydrophilicity, water resistance, etc., its lower-limit value is set to 100 or greater, or preferably 200 or greater, or more preferably 250 or greater, or yet more preferably 300 or greater, or even more preferably 400 or greater, while its upper-limit value is set to 5,000 or smaller, or preferably 3,000 or smaller, or more preferably 2,000 or smaller, or yet more preferably 1,000 or smaller, or even more preferably 750 or smaller. For example, the range of the weight-average molecular weight may be set to 100 to 5,000, or preferably 200 to 3,000, or more preferably 400 to 750.

The content of the aforementioned polyalkylene glycol (a2-1) is preferably 99% by mol or lower but no lower than 10% by mol, or more preferably lower than 97% by mol but no lower than 30% by mol, or yet more preferably lower than 95% by mol but no lower than 60% by mol, relative to the total quantity of the polyol component.

Also, from the viewpoint of increasing the branching property of the resin, preferably at least one type of trifunctional or higher polyfunctional polyol is contained.

The content of the aforementioned trifunctional or higher polyfunctional polyol is preferably 50% by mol or lower but no lower than 1% by mol, or more preferably lower than 40% by mol but no lower than 3% by mol, or yet more preferably lower than 30% by mol but no lower than 5% by mol, relative to the total quantity of the polyol component.

The esterification or ester exchange reaction of the polycarboxylic acid component and polyol component may be performed by any known method; for example, it may be achieved by polycondensing the polycarboxylic acid component and polyol component at a temperature of around 180 to 250° C.

Also, the aforementioned polyester resin may be modified with a fatty acid, monoepoxy compound, etc., during the preparation of the polyester resin or after the esterification reaction. The aforementioned fatty acid may be, for example, fatty acid of palm oil, fatty acid of cottonseed oil, fatty acid of hempseed oil, fatty acid of rice bran oil, fatty acid of fish oil, fatty acid of tall oil, fatty acid of soybean oil, fatty acid of flaxseed oil, fatty acid of tung oil, fatty acid of canola oil, fatty acid of castor oil, fatty acid of dehydrated castor oil, fatty acid of safflower oil, etc., while the aforementioned monoepoxy compound may be, for example, "Cardura E10P" (product name, manufactured by Japan Epoxy Resin Co., Ltd., glycidyl ester of synthetic hyperbranched fatty acid), etc.

Also, from the viewpoint of increasing the acid value and thereby enhancing the storage stability of the polyester resin (A) in an aqueous medium, preferably a polycarboxylic acid is further added to the resin obtained by polycondensing the aforementioned polycarboxylic acid component and polyol component. For the polycarboxylic acid to be added, any polycarboxylic acid included in the polycarboxylic acid component may be used.

Suitably the polyester resin (A) thus obtained has a number-average molecular weight in a range of 500 to 10,000, or preferably 700 to 5,000, or more preferably 1,000 to 3,000, from the viewpoint of the smoothness of the coating film to be obtained. Also, from the viewpoint of curing property, suitably its hydroxyl value is in a range of 10 to 200 mgKOH/g, or preferably 30 to 180 mgKOH/g, or more preferably 45 to 165 mgKOH/g. Suitably its acid value is in a range of 5 to 200 mgKOH/g, or preferably 10 to 180 mgKOH/g, or more preferably 15 to 165 mgKOH/g.

As for the aforementioned polyester resin (A), a certain quantity or more of trifunctional or higher polyfunctional monomers may be used to branch the resin and thereby create many resin terminal ends. Also, when there is a hydrophilic long-chain structure inside the resin, the resin can expand in a hydrophilic solvent. These actions trigger hydrophobic interactions between the acrylic resin particles (B) described below and the resin terminal ends, so that the aqueous coating material composition will have excellent thixotropic property and a multilayer coating film having good smoothness, clarity and/or flip-flop property will be obtained.

It should be noted that, since the polyester resin (A) is characterized by having a branched structure, the trifunctional or higher polyfunctional polycarboxylic acid (a1) is not included in the calculation of the aforementioned content when a polycarboxylic acid is added after the polyester resin has been synthesized.

Acrylic Resin Particles (B)

For the acrylic resin particles (B) used in the aqueous coating material composition proposed by the present invention, any acrylic resin used in aqueous coating material applications and dispersed in particle state in an aqueous medium, may be used without limitation.

The method for dispersing the acrylic resin in water, or method for manufacturing an emulsion of the acrylic resin, is not limited; however, examples include a method whereby the polymerizable unsaturated monomer components are emulsion-polymerized in an aqueous medium using a polymerization initiator in the presence of an emulsifier, a method whereby the resin is manufactured by means of solution polymerization in an organic solvent and then forcibly dispersed in water using an emulsifier, and a method whereby the resin with hydrophilic groups is manufactured by means of solution polymerization in an organic solvent and then let disperse in water through self-emulsification, and the like.

Preferably any acrylic resin particle (B) that may be used in the present invention contains core-shell type acrylic resin particles (B1), and the ratio of the copolymer (I) constituting the core parts and the copolymer (II) constituting the shell parts falls preferably in a range of around 10/90 to 90/10, or more preferably in a range of 50/50 to 90/10, based on the total quantity of monomer components.

Polymerizable Unsaturated Monomers (b) Constituting Acrylic Resin Particles (B)

For the polymerizable unsaturated monomers (b) constituting the aforementioned acrylic resin particles (B), the compounds having polymerizable unsaturated groups (b1) to (b5) described below may be suitably used.

It should be noted that, in this Specification, "polymerizable unsaturated groups" refers to unsaturated groups that could undergo radical polymerization. Such polymerizable unsaturated groups include vinyl groups, (meth)acryloyl groups, etc., for example.

Also, "(meth)acrylate" refers to "acrylate or methacrylate," "(meth)acrylic acid" refers to "acrylic acid or methacrylic acid," "(meth)acryloyl" refers to "acryloyl or methacryloyl," and "(meth)acrylamide" refers to "acrylamide or methacrylamide," respectively.

Polymerizable Unsaturated Monomers (b1) Having Straight-Chain, Branched, or Cyclic Saturated or Unsaturated Hydrocarbon Groups with 4 or More Carbon Atoms Polymerizable unsaturated monomers having straight-chain, branched, or cyclic saturated or unsaturated hydrocarbon groups with 4 or more carbon atoms exclude hydroxyl group-containing polymerizable unsaturated monomers and other monomers having hydrophilic groups. Specific examples of such monomers include, for example: n-butyl (meth)acrylate, i-butyl (meth)acrylate, t-butyl (meth)acrylate, n-hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, tricyclodecanyl (meth)acrylate, and other alkyl or cycloalkyl (meth)acrylates; isobornyl (meth)acrylate and other polymerizable unsaturated compounds having isobornyl groups; adamantyl (meth)acrylate and other polymerizable unsaturated compounds having adamantyl groups; benzyl (meth)acrylate, styrene, α-methyl styrene, vinyl toluene, and other aromatic ring-containing polymerizable unsaturated monomers, etc.

Polymerizable Unsaturated Monomers (b2) Having Two or More Polymerizable Unsaturated Groups in One Molecule Specific examples of polymerizable unsaturated monomers having two or more polymerizable unsaturated groups in one molecule include, for example, allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth)acrylate 1,1,1-trishydroxymethylpropane tri(meth)acrylate, triallyl isocyanurate, diallyl terephthalate, divinyl benzene, etc.

Hydroxyl Group-Containing Polymerizable Unsaturated Monomers (b3)

Specific examples of hydroxyl group-containing polymerizable unsaturated monomers include, for example, 2-hydroxyethyl (meth)acrylate, 2-hydroxypropyl (meth)acrylate, 3-hydroxypropyl (meth)acrylate, 4-hydroxybutyl (meth)acrylate, and other monoesterified products of a (meth)acrylic acid and a bivalent alcohol with 2 to 8 carbon atoms, ε-caprolactone-modified products of such monoesterified products of a (meth)acrylic acid and a bivalent alcohol with 2 to 8 carbon atoms, N-hydroxymethyl (meth)acrylamide, allyl alcohol, (meth)acrylates having a polyoxyalkylene group whose molecular terminal end is a hydroxyl group, etc.

Carboxyl Group-Containing Polymerizable Unsaturated Monomers (b4)

Specific examples of carboxyl group-containing polymerizable unsaturated monomers include, for example, (meth)acrylic acid, maleic acid, crotonic acid, β-carboxyethyl acrylate, etc.

Polymerizable Unsaturated Monomers (b4) Other than (b1) to (b4)

Polymerizable unsaturated monomers other than (b1) to (b4) include, for example: methyl (meth)acrylate, ethyl (meth)acrylate, n-propyl (meth)acrylate, isopropyl (meth)acrylate, and other alkyl (meth)acrylates with 3 or fewer carbon atoms; amine adducts of (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, and glycidyl (meth)acrylate, and other nitrogen-containing polymerizable unsaturated monomers free of urethane bonds; reaction products of an isocyanate group-containing polymerizable unsaturated monomer and a hydroxyl group-containing compound, reaction products of a hydroxyl group-containing polymerizable unsaturated monomer and an isocyanate group-containing compound, and other polymerizable unsaturated monomers having an urethane bond; glycidyl (meth)acrylate, β-methyl glycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, and other epoxy group-containing polymerizable unsaturated monomers; (meth)acrylates having a polyoxyethylene chain whose molecular terminal end is an alkoxy group; 2-acrylamide-2-methylpropane sulfonic acid, 2-sulfoethyl (meth)acrylate, allyl sulfonic acid, 4-styrene sulfonic acid, etc., sodium salts and ammonium salts of these sulfonic acids, and other polymerizable unsaturated monomers having a sulfonic acid group; vinyltrimethoxysilane, vinyltriethoxysilane, vinyltris(2-methoxyethoxy)silane, γ-(meth)acryloyloxypropyltrimethoxysilane, γ-(meth)acryloyloxypropyltriethoxysilane, and other polymerizable unsaturated monomers having an alkoxy silyl group; perfluorobutylethyl (meth)acrylate, perfluorooctylethyl (meth)acrylate, and other perfluoroalkyl (meth)acrylates; fluoroolefine and other polymerizable unsaturated monomers having a fluorinated alkyl group; polymerizable unsaturated monomers having a maleimide group or other photopolymerizable functional group; (meth)acrylates having a polyoxyethylene chain whose molecular terminal end is an alkoxy group, etc.

Any of these may be suitably used without limitation, so long as it can be copolymerized with other polymerizable unsaturated monomers as a polymerizable unsaturated monomer constituting the acrylic resin particles (B).

Core Part Copolymer (I)

Preferably the core part copolymer (I) constituting the acrylic resin particles (B) used in the aqueous coating material composition proposed by the present invention is a copolymer characterized by being of crosslinked structure. Regarding the method for making the aforementioned core part copolymer (I) of crosslinked structure, monomers constituting the core part including polymerizable unsaturated monomers (b2) having two or more polymerizable unsaturated groups in one molecule may be copolymerized and thus crosslinked, or monomer components including cross-reacting polymerizable unsaturated monomers such as isocyanate group-containing polymerizable unsaturated monomers and hydroxyl group-containing polymerizable unsaturated monomers, or glycidyl group-containing polymerizable unsaturated monomers and carboxyl group-containing polymerizable unsaturated monomers, may be copolymerized and thus crosslinked; more preferred, however, is to achieve crosslinking using polymerizable unsaturated monomers (b2) having two or more polymerizable unsaturated groups in one molecule.

The aforementioned polymerizable unsaturated monomers (b2) having two or more polymerizable unsaturated groups in one molecule has a function to add a crosslinked structure to the core part copolymer (I), and suitably any one type may be used alone or two or more types may be combined, each selected from the polymerizable unsaturated monomers given as examples under "Polymerizable Unsaturated Monomers (b2) Having Two or More Polymerizable Unsaturated Groups in One Molecule" above; from the viewpoint of the viscosity and coating film performance of the coating material to be obtained, however, preferably methylene bis(meth)acrylamide, allyl (meth)acrylate, or ethylene glycol di(meth)acrylate is used.

Polymerizable unsaturated monomers (b2) having two or more polymerizable unsaturated groups in one molecule are contained in the core part by preferably 0.1 to 15 parts by mass, or more preferably 1 to 10 parts by mass, or most preferably 1 to 5 parts by mass, relative to the total quantity of monomer components in the core part.

For the copolymer components of the aforementioned core part copolymer (I), suitably any one type may be used alone or two or more types may be combined, each selected from the polymerizable unsaturated monomers given as examples under "Copolymerized Unsaturated Monomers (b1) Having Hydrocarbon Groups with 4 or More Carbon Atoms," "Hydroxyl Group-containing Polymerizable Unsaturated Monomers (b3)," "Carboxyl Group-containing Polymerizable Unsaturated Monomers (b4)," and "Polymerizable Unsaturated Monomers (b5) Other Than (b1) to (b4)" above, other than the aforementioned polymerizable unsaturated monomers (b2) having two or more polymerizable unsaturated groups in one molecule.

Shell Part Copolymer (II)

Preferably the shell part copolymer (II) constituting the acrylic resin particles (B) used in the aqueous coating material composition proposed by the present invention contains hydroxyl group-containing polymerizable unsaturated monomers (b3) and carboxyl group-containing polymerizable unsaturated monomers (b4) as constitutional components of the copolymer.

Also, from the viewpoint of the smoothness and clarity of the coating film to be obtained, preferably polymerizable unsaturated monomers (b2) having two or more polymerizable unsaturated groups in one molecule are not used and the copolymer (II) remains uncrosslinked.

The aforementioned hydroxyl group-containing polymerizable unsaturated monomers (b3) have a function to improve the water resistance, etc., of the coating film, while also improving the stability of the acrylic resin particles in an aqueous medium, by introducing hydroxyl groups that undergo crosslinking reaction with the curing agent (C) to the obtained acrylic resin particles (B). While suitably any one type may be used alone or two or more types may be combined, each selected from the polymerizable unsaturated monomers given as examples under "Hydroxyl Group-containing Polymerizable Unsaturated Monomers (b3)" above, preferably 2-hydroxyethyl (meth)acrylate, 2-hydroxypropyl (meth)acrylate, 3-hydroxypropyl (meth)acrylate or 4-hydroxybutyl (meth)acrylate is used, or more preferably 2-hydroxyethyl (meth)acrylate is used.

Also, the aforementioned carboxyl group-containing polymerizable unsaturated monomers (b4) have a function to improve the stability of the acrylic resin particles to be obtained in an aqueous medium. While suitably any one type may be used alone or two or more types may be combined, each selected from the polymerizable unsaturated monomers given as examples under "Carboxyl Group-containing Polymerizable Unsaturated Monomers (b4)" above, preferably (meth)acrylic acid is used.

The polymerizable unsaturated monomers used as monomers for the shell part copolymer (II) are not limited in any way, and any polymerizable unsaturated monomer that can be copolymerized with other polymerizable unsaturated monomers, as a polymerizable unsaturated monomer constituting the shell part copolymer (II), may be suitably used. For example, any of the polymerizable unsaturated monomers given as examples under "Polymerizable Unsaturated Polymers (b5) Other Than (b1) to (b4)" above may be suitably used as necessary. Of these monomers, any one type may be used alone or two or more types may be combined.

The hydroxyl value of the acrylic resin particles (B) is preferably around 5 to 200 mgKOH/g, or more preferably around 10 to 150 mgKOH/g, or yet more preferably around 20 to 100 mgKOH/g, from the viewpoint of ensuring excellent stability of the acrylic resin particles in an aqueous medium and water resistance of the coating film to be obtained.

The acid value of the acrylic resin particles (B) is preferably around 5 to 100 mgKOH/g, or more preferably around 10 to 80 mgKOH/g, or yet more preferably around 15 to 50 mgKOH/g, from the viewpoint of ensuring excellent stability of the acrylic resin in an aqueous medium and water resistance of the coating film to be obtained.

Also, preferably the acrylic resin particles (B) used in the aqueous coating material composition proposed by the present invention contain the aforementioned polymerizable unsaturated monomers (b1) having straight-chain, branched, or cyclic saturated or unsaturated hydrocarbon groups with 4 or more carbon atoms as constitutional components of the core part and/or shell part copolymer(s). While suitably any one type may be used alone or two or more types may be combined, each selected from the polymerizable unsaturated monomers given as examples under "Polymerizable Unsaturated Monomers (b1) Having Straight-chain, Branched, or Cyclic Saturated or Unsaturated Hydrocarbon Groups with 4 or More Carbon Atoms" above, preferably n-butyl (meth)acrylate, i-butyl (meth)acrylate, 2-ethylhexyl (meth)acrylate or styrene is used.

When the aforementioned polymerizable unsaturated monomers (b1) having straight-chain, branched, or cyclic saturated or unsaturated hydrocarbon groups with 4 or more carbon atoms are contained, a base coating film of lower polarity will be obtained and, if the bottom layer is an uncured aqueous primer coat composition, layer mixing with the primer coating film can be prevented. Also, the aqueous coating material composition will exhibit excellent thixotropic property due to expression of the aforementioned hydrophobic interactions with the polyester resin (A), and a multilayer coating film having good smoothness, clarity, and flip-flop property can be obtained as a result.

From the viewpoint of the smoothness and clarity of the multilayer coating film to be obtained, the use ratio of the aforementioned polymerizable unsaturated monomers (b1) having straight-chain, branched, or cyclic saturated or unsaturated hydrocarbon groups with 4 or more carbon atoms is preferably around 3 to 70 parts by mass, or more preferably around 15 to 65 parts by mass, relative to the total mass of the monomers constituting the acrylic resin particles (B).

The emulsion polymerization through which to prepare an emulsion of the core part copolymer (I) can be performed by any conventionally known method. For example, it may be performed by emulsion-polymerizing a monomer mixture using a polymerization initiator in the presence of an emulsifier.

For the aforementioned emulsifier, anionic emulsifiers and nonionic emulsifiers are suitable. The anionic emulsifiers include, for example, alkyl sulfonic acid, alkylbenzene sulfonic acid, alkyl phosphoric acid and other sodium salts or ammonium salts. Also, nonionic emulsifiers include, for example, polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, polyoxyethylene sorbitan monolaurate, etc.

Also, polyoxyalkylene group-containing anionic emulsifiers having an anionic group and a polyoxyethylene group, polyoxypropylene group, or other polyoxyalkylene group in one molecule, as well as reactive anionic emulsifiers having an anionic group and a radical-polymerizable unsaturated group in one molecule, may also be used. Among these, use of reactive anionic emulsifiers is preferred.

The aforementioned reactive anionic emulsifiers include, for example, sodium salts of sulfonic acid compounds having an allyl group, methallyl group, (meth)acryloyl group, propenyl group, butenyl group, or other radical-polymerizable unsaturated group, as well as ammonium salts of such sulfonic acid compounds. Among these, ammonium salts of sulfonic acid compounds having a radical-polymerizable unsaturated group are preferred in that the coating film to be obtained will have excellent water resistance. Commercial products of such ammonium salts of sulfonic acid compounds include "LATEMUL S-180A," (product name, manufactured by Kao Corporation), etc., for example.

Also, among the aforementioned ammonium salts of sulfonic acid compounds having a radical-polymerizable unsaturated group, ammonium salts of sulfonic acid compounds having a radical-polymerizable unsaturated group and a polyoxyalkylene group are more preferred. Commercial products of the aforementioned ammonium salts of sulfonic acid compounds having a radical-polymerizable unsaturated group and a polyoxyalkylene group include "AQUALON KH-10" (product name, manufactured by DKS Co., Ltd.), "SR-1025A" (product name, manufactured by ADEKA Corporation), etc., for example.

The use quantity of the aforementioned emulsifier is preferably around 0.1 to 15% by mass, or more preferably around 0.5 to 10% by mass, or yet more preferably around 1 to 5% by mass, relative to the total mass of all monomers used.

The aforementioned polymerization initiator may be any of the following, for example: benzoyl peroxide, octanoyl peroxide, lauroyl peroxide, stearoyl peroxide, cumene hydroperoxide, tert-butyl peroxide, tert-butyl peroxylaurate, tert-butyl peroxyisopropyl carbonate, tert-butyl peroxyacetate, diisopropyl benzene hydroperoxide, and other organic peroxides; azobisisobutyronitrile, azobis(2,4-dimethylvaleronitrile), azobis(2-methylpropionitrile), azobis(2-methylbutyronitrile), 4,4'-azobis(4-cyanobutanoic acid), dimethyl azobis(2-methylpropionate), azobis[2-methyl-N-(2-hydroxyethyl)-propionamide], azobis{2-methyl-N-[2-(1-hydroxybutyl)]-propionamide}, and other azo compounds; potassium persulfate, ammonium persulfate, sodium persulfate, and other persulfates, etc. Any one type of these polymerization initiators may be used alone or two or more types may be combined. Also, the aforementioned polymerization initiator may be combined with sugar, sodium formaldehyde sulfoxylate, iron complex, or other reducing agent, if necessary, and used as a redox initiator.

In general, the use quantity of the aforementioned polymerization initiator is preferably around 0.1 to 5% by mass, or more preferably around 0.2 to 3% by mass, relative to the total mass of all monomers used. The method for adding the polymerization initiator is not limited in any way, and any method may be selected as deemed appropriate according to the type and quantity of the polymerization initiator, etc. For example, it may be pre-mixed in a monomer mixture or aqueous medium, or added all at once, or dripped, at the time of polymerization.

The core-shell type acrylic resin particles (B) may be obtained by adding a polymerizable unsaturated monomer mixture for the shell part to the emulsion of the core part copolymer (I) obtained above, and then polymerized further to form a shell part copolymer (II).

The monomer mixture for forming the aforementioned shell part copolymer (II) may contain, if necessary, the aforementioned polymerization initiator, chain transfer agent, reducing agent, emulsifier, and other components as deemed appropriate. Also, while the monomer mixture may be dripped directly, ideally it is dripped in the form of a monomer emulsion obtained by dispersing the monomer mixture in an aqueous medium. In this case, the particle size of the monomer emulsion is not limited in any way.

Methods for polymerizing the monomer mixture for forming the shell part copolymer (II) include, for example, a method whereby the monomer mixture or emulsion thereof is added to the emulsion of the aforementioned core part copolymer (I) all at once or through slow dripping, after which the mixture is heated to an appropriate temperature under agitation.

The acrylic resin particles (B) thus obtained have a core-shell type multi-layer structure and are water-dispersible, and may have an average particle size in a range of around 10 to 1,000 nm in general, or particularly in a range of around 20 to 500 nm.

In this Specification, the average particle size of the acrylic resin particles (B) represents a value measured at 20° C. using a submicron particle-size distribution measuring device based on a sample diluted with deionized water according to a common method. For the submicron particle-size distribution measuring device, "COULTER N4" (product name, manufactured by Beckman Coulter, Inc.) may be used, for example.

To improve the mechanical stability of the acrylic resin particles (B), ideally the carboxyl groups and other acid groups in the acrylic resin particles are neutralized using a neutralizer. Such neutralizer is not limited in any way, so long as the acid groups can be neutralized, and it may be sodium hydroxide, potassium hydroxide, trimethylamine, 2-(dimethylamino)ethanol, 2-amino-2-methyl-1-propanol, triethylamine, ammonia water, etc. Ideally these neutralizers are used in quantities that will bring the neutralized water dispersion of the acrylic resin particles (B) to a pH of around 6.5 to 9.0.

Preferably the acrylic resin particles (B) have a core-shell structure whose core part has been crosslinked, while also containing strongly hydrophobic polymerizable unsaturated monomers (b1) having straight-chain, branched, or cyclic saturated or unsaturated hydrocarbon groups with 4 or more carbon atoms. Containing such acrylic resin particles (B), the aqueous coating material composition proposed by the present invention will, even when applied wet-on-wet in multi-coat applications, prevent layer mixing with the top layer and/or bottom layer because it contains strongly hydrophobic crosslinked particles.

Also, the aforementioned acrylic resin particles (B), being strongly hydrophobic, have high viscosity expression property, as well as a viscosity property of decreasing viscosity with increase in shear velocity, due to the hydrophobic interactions with the polyester resin (A) and association-type viscosity-adjusting agent. This means good atomization at application and high viscosity when adhered, which prevents layer mixing and ensures good orientation of the photoluminescent pigment and appearance of the coating film.

These effects allow for formation of a multilayer coating film having excellent smoothness, clarity, flip-flop property, and/or water resistance.

Curing Agent (C)

The curing agent (C) is a compound that can cure the aqueous coating material composition proposed by the present invention, by reacting with the hydroxyl groups, carboxyl groups, epoxy groups, and other crosslinkable functional groups in the aforementioned polyester resin (A) and/or acrylic resin particles (B). The curing agent (C) may be, for example, an amino resin, polyisocyanate compound, block polyisocyanate compound, epoxy group-containing compound, carboxyl group-containing compound, carbodiimide group-containing compound, etc. Among these, a block polyisocyanate compound and/or amino resin that can react with hydroxyl groups is/are preferred from the viewpoint of the water resistance and storability of the coating film to be obtained. Any one type of these may be used alone or two or more types may be combined.

Block Polyisocyanate Compound

The aforementioned block polyisocyanate compound is not limited in any way, and may be synthesized using a standard polyisocyanate compound and a blocking agent.

The aforementioned polyisocyanate compound is obtained using any of the diisocyanates mentioned below as a primary ingredient.

Diisocyanates include aliphatic and/or alicyclic diisocyanates. Preferred are diisocyanates with 4 to 30 carbon atoms among aliphatic diisocyanates, and those with 8 to 30 carbon atoms among alicyclic diisocyanates, including, for example, 1,4-tetramethylene diisocyanate, 1,5-pentamethylene diisocyanate, 1,6-hexamethylene diisocyanate, 2,2,4-trimethyl-1,6-hexamethylene diisocyanate, lysine diisocyanate, isophorone diisocyanate, 1,3-bis(isocyanatomethyl)-cyclohexane, 4,4'-dicyclohexylmethane diisocyanate, etc. Among these, 1,6-hexamethylene diisocyanate and isophorone diisocyanate are preferred for weather resistance and/or availability in industrial settings, where each may be used alone or both may be combined.

The aforementioned polyisocyanate compound is an oligomer having around 2 to 20 isocyanate groups in one molecule, representing a dimer to icosamer of a diisocyanate manufactured by forming biuret bonds, urea bonds, isocyanurate bonds, uretdione bonds, urethane bonds, allophanate bonds, oxadiazine trion bonds, etc., for example.

For the blocking agent with which to block the isocyanate groups in the aforementioned polyisocyanate compound, any known blocking agent may be used; for example, active methylene-based, phenol-based, alcohol-based, mercaptan-based, acid amide-based, imide-based, amine-based, imidazole-based, urea-based, carbamate-based, imine-based, oxime-based, and sulfite-based compounds, etc., may be suitably used.

Also, from the viewpoint of storage stability and curing property of the aqueous coating material composition as well as smoothness and clarity of the multilayer coating film to be formed, preferably the aforementioned block polyisocyanate compound is a block polyisocyanate compound having hydrophilic groups.

The aforementioned block polyisocyanate compound having hydrophilic groups may be obtained using, for example, an active hydrogen-containing compound having nonionic hydrophilic groups, active hydrogen-containing compound having anionic hydrophilic groups, active hydrogen-containing compound having cationic hydrophilic groups, or other active hydrogen-containing compound having hydrophilic groups.

The aforementioned active hydrogen-containing compound having hydrophilic groups is preferably an active hydrogen-containing compound having nonionic hydrophilic groups, wherein polyethylene glycol monomethyl ether, polyethylene glycol monoethyl ether, or polyethylene glycol is more preferred, and polyethylene glycol monomethyl ether is even more preferred.

Also, for the block polyisocyanate compound, an active methylene type block polyisocyanate compound may be suitably used.

Amino Resin

For the amino resin, a partially methylolated amino resin or completely methylolated amino resin obtained through reaction between an amino component and an aldehyde component, may be used. The amino component may be melamine, urea, benzoguanamine, acetoguanamine, steroguanamine, spiroguanamine, dicyandiamide, etc., for example. The aldehyde component may be formaldehyde, paraformaldehyde, acetaldehyde, benzaldehyde, etc., for example.

Also, the aforementioned methylolated amino resin whose methylol groups have been partially or completely etherified with an appropriate alcohol may be used. The alcohol used for etherification may be methyl alcohol, ethyl alcohol, n-propyl alcohol, isopropyl alcohol, n-butyl alcohol, isobutyl alcohol, 2-ethylbutanol, 2-ethylhexanol, etc., for example.

Preferably the amino resin is a melamine resin. In particular, a methyl-etherified melamine resin obtained by partially or completely etherifying the methylol groups in a partially or completely methylolated melamine resin using methyl alcohol, butyl-etherified melamine resin obtained by partially or completely etherifying the methylol groups in a partially or completely methylolated melamine resin using butyl alcohol, or methyl-butyl-mixture-etherified melamine resin obtained by partially or completely etherifying the methylol groups in a partially or completely methylolated melamine resin using methyl alcohol and butyl alcohol, is preferred.

Also, from the viewpoint of excellent water resistance of the coating film to be obtained, the aforementioned melamine resin has a weight-average molecular weight of preferably 400 to 6,000, or more preferably 500 to 4,000, or yet more preferably 600 to 3,000.

For the melamine resin, any commercial product may be used. Names of commercial products include, for example, "CYMEL 202," "CYMEL 203," "CYMEL 238," "CYMEL 251," "CYMEL 303," "CYMEL 323," "CYMEL 324," "CYMEL 325," "CYMEL 327," "CYMEL 350," "CYMEL 385," "CYMEL 1156," "CYMEL 1158," "CYMEL 1116," "CYMEL 1130" (all manufactured by Cytec Industries Japan LLC), "U-VAN 120," "U-VAN 20HS," "U-VAN 20SE60," "U-VAN 2021," "U-VAN 2028," "U-VAN 28-60" (all manufactured by Mitsui Chemicals, Inc.), etc.

Coloring Pigment (D)

The coloring pigment (D) used in the aqueous coating material composition proposed by the present invention may be a coloring pigment, photoluminescent pigment, etc., for example. Any of these may be used alone, or two or more types may be combined. In particular, preferably at least one type of photoluminescent pigment is contained.

The aforementioned photoluminescent pigment may be, for example, aluminum (including vapor-deposited aluminum), copper, zinc, brass, nickel, aluminum oxide, mica, aluminum oxide coated with titanium oxide or iron oxide, mica coated with titanium oxide or iron oxide, glass flake, hologram pigment, etc. Among these, use of aluminum, aluminum oxide, mica, aluminum oxide coated with titanium oxide or iron oxide, or mica coated with titanium oxide or iron oxide, is preferred, while use of aluminum is particularly preferred. Aluminum pigments include non-leafing type aluminum pigments and leafing type aluminum pigments, and either may be used. Any of the aforementioned photoluminescent pigments may be used alone or two or more types may be combined.

If the aqueous coating material composition contains the aforementioned photoluminescent pigment, suitably the content of the photoluminescent pigment is in a range of normally 1 to 50 parts by mass, or preferably 2 to 30 parts by mass, or more preferably 3 to 20 parts by mass, relative to 100 parts by mass representing the solids content of resin as a total of the polyester resin (A), acrylic resin particles (B), and curing agent (C).

The aforementioned coloring pigment may be any of titanium oxide, zinc oxide, carbon black, molybdenum red, Prussian blue, cobalt blue, azo-based pigments, phthalocyanine-based pigments, quinacridone-based pigments, isoindolinone-based pigments, threne-based pigments, perylene-based pigments, dioxazine-based pigments, diketopyrrolopyrrole-based pigments, etc., for example.

If the aqueous coating material composition contains the aforementioned coloring pigment, suitably the content of the coloring pigment is in a range of normally 1 to 150 parts by mass, or preferably 3 to 130 parts by mass, or more preferably 5 to 110 parts by mass, relative to 100 parts by mass representing the solids content of resin as a total of the polyester resin (A), acrylic resin particles (B), and curing agent (C).

Also, in addition to the aforementioned coloring pigment, an extender pigment may be used together. The aforementioned extender pigment may be any of talc, clay, kaolin, baryta, barium sulfate, barium carbonate, calcium carbonate, silica, alumina white, etc., for example, where any of these may be used alone or two or more types may be combined.

If the aqueous coating material composition proposed by the present invention contains the aforementioned extender pigment, suitably the content of the extender pigment is in a range of normally 1 to 200 parts by mass, or preferably 2 to 100 parts by mass, or more preferably 3 to 50 parts by mass, relative to 100 parts by mass representing the solids content of resin as a total of the polyester resin (A), acrylic resin particles (B), and curing agent (C).

Compositional Makeup of, and Method for Preparing, Aqueous Coating Material Composition In the aqueous coating material composition proposed by the present invention, the polyester resin (A), acrylic resin particles (B), and curing agent (C) may be contained by quantities in the ranges described below relative to 100 parts by mass representing the solids content of resin as a total of the polyester resin (A), acrylic resin particles (B), and curing agent (C).

Polyester resin (A): 1 to 90 parts by mass, or preferably 5 to 80 parts by mass, or more preferably 10 to 70 parts by mass Acrylic resin particles (B): 1 to 90 parts by mass, or preferably 5 to 80 parts by mass, or more preferably 10 to 70 parts by mass Curing agent (C): 5 to 60 parts by mass, or preferably 10 to 50 parts by mass, or more preferably 20 to 40 parts by mass It should be noted that "aqueous coating material composition" is a term used in contrast to coating material compositions of organic solvent type, and generally refers to a coating material composition comprising water or other medium whose primary component is water (aqueous medium) in which coating film-forming resin, pigment, etc., are dispersed and/or dissolved.

Also, the aqueous coating material composition proposed by the present invention may contain a hydrophilic organic solvent and/or hydrophobic organic solvent as necessary. The aforementioned hydrophilic organic solvent is not limited in any way so long as it is compatible with water, and may specifically be ethylene glycol monobutyl ether, propylene glycol monomethyl ether, propylene glycol monopropyl ether, etc., for example. Any one type of these may be used alone, or two or more types may be combined.

Suitably the water content in the aqueous coating material composition proposed by the present invention is in a range of 10 to 90% by mass, or preferably 20 to 80% by mass, or more preferably 30 to 70% by mass.

Suitably the solids content concentration of the aqueous coating material composition proposed by the present invention is in a range of generally 10 to 60% by mass, or preferably 15 to 50% by mass, or more preferably 20 to 40 precent by mass.

In this Specification, "solids content" as it pertains to a coating material, resin, etc., refers to the nonvolatile components remaining after 1 hour of drying at 110° C. For example, the solids content of a coating material refers to the nonvolatile components, such as base resin, crosslinking agent, pigment, etc., contained in the coating material, remaining after 1 hour of drying at 110° C. Accordingly, the solids content concentration of a coating material can be calculated by taking a measured quantity of the coating material in an aluminum foil cup or other heat-resistant container, spreading the coating material at the bottom of the container, drying it for 1 hour at 110° C., weighing the mass of the coating material components remaining after drying, and obtaining the percentage of the mass of the coating material components remaining after drying relative to the total mass of the coating material before drying.

While the aqueous coating material composition proposed by the present invention contains a polyester resin (A), acrylic resin particles (B), a curing agent (C), and a coloring pigment (D), preferably it further contains a urethane resin (E) and/or polyether polyol (F).

The aforementioned urethane resin (E) may be obtained by reacting a polyol compound and a polyisocyanate compound. For the aforementioned polyol compound, the polyol (a2) cited in the explanation of the polyester resin (A) may be suitably used, for example. For the aforementioned polyisocyanate compound, the polyisocyanate compound cited in the explanation of the block polyisocyanate compound may be suitably used, for example.

If the aqueous coating material composition proposed by the present invention contains the aforementioned urethane resin (E), suitably its content is in a range of 1 to 40 parts by mass, or preferably 5 to 20 parts by mass, relative to the solids content by mass of resin.

To be specific, the aforementioned polyether polyol (F) may be, for example, polyethylene glycol, polypropylene glycol, polytetramethylene glycol, polyoxyalkylene glyceryl ether, etc., any of which may be used alone or two or more types may be combined. It should be noted that the polyether polyol (F) is a component other than the aforementioned components (A) to (E).

Particularly preferably the aqueous coating material composition proposed by the present invention contains the aforementioned polyether polyol (F). When it contains the polyether polyol (F), a coating film having excellent finish and appearance can be obtained.

Preferably for the aforementioned polyether polyol (F), one whose number-average molecular weight is in a range of 200 to 3000, or specifically in a range of 300 to 1500, or specifically in a range of 400 to 750, and whose hydroxyl value is in a range of 30 to 500 mgKOH/g, or specifically in a range of 60 to 300 mgKOH/g, is used.

Commercial products for the polyether polyol (F) include SANNIX PP-200, PP-400, PP-600, PP-1000, PP-2000, PP-3000, GP-600, GP-1000, GP-3000, GL-3000, FA-103, FA-703 (all manufactured by Sanyo Chemical Industries, Ltd.), EXCENOL EL-1020, EL-2020, EL-3020, EL-510, EL-540, EL-3030, EL-5030, EL-823, EL-828, EL-830, EL-837, EL-840, EL-850, EL-851B (all manufactured by Asahi Glass Urethane Co., Ltd.), PREMINOL PML-3005, PML-3012, PML-4002, PML-5001, PML-7001 (all manufactured by Asahi Glass Urethane Co., Ltd.), etc.

If the aqueous coating material composition proposed by the present invention contains the aforementioned polyether polyol (F), suitably its content is in a range of 0.01 to 20 parts by mass, or preferably 0.05 to 5 parts by mass, or more preferably 0.1 to 2 parts by mass, relative to the solids content by mass of resin, in that a coating film having excellent finish quality can be obtained.

Furthermore, the aqueous coating material composition proposed by the present invention may be prepared by mixing or dispersing other coating material resins and additives in an aqueous medium, as necessary, using any method which is known itself. Such coating material resins include water-soluble and/or water-dispersible resins other than (A), (B), (C), (E), and (F), while such coating material additives include, for example, viscosity-adjusting agent, curing catalyst, UV absorbent, photostabilizer, defoaming agent, plasticizer, surface conditioner, anti-settling agent, etc.

To be specific, the aforementioned viscosity-adjusting agent may be, for example, fatty acid amide, polyamide, acrylamide, long-chain polyaminoamide, aminoamide, or salt thereof (such as phosphate), or other polyamide-based rheology controlling agent; polyether polyol-based urethane prepolymer, urethane-modified polyether type viscosity-adjusting agent or other urethane-based rheology controlling agent; high-molecular-weight polycarboxylic acid, high-molecular-weight unsaturated acid polycarboxylic acid, or partially amidated product thereof, or other polycarboxylic acid-based rheology controlling agent; hydroxyethyl cellulose, hydroxypropyl cellulose, or other cellulose-based rheology controlling agent; montmorillonite, bentonite, clay, or other inorganic lamellar compound-based rheology controlling agent; hydrophobic modified ethoxylate aminoplast or other aminoplast-based rheology controlling agent, etc., of which any one type may be used alone or a mixture of two or more types may be used.

Method for Forming Coating Film Proposed by Present Invention

For the method for forming a coating film using the aqueous coating material composition proposed by the present invention, at least one type selected from methods I to V below that involve forming a single-layer coating film or multilayer coating film on a target object, may be suitably used. Also, a coated article may be obtained using the method for forming a coating film according to any one of methods I to V below.

Under the present invention, a suitable method may be constituted for forming a coating film according to the polycarboxylic acid component among the monomer components of the polyester resin (A) contained in the aqueous coating material composition.

If the polycarboxylic acid component among the monomer components is a tetrafunctional or higher polyfunctional polycarboxylic acid component, preferably the method for forming a coating film according to one of methods I, II, and V below is used in order to form a good multilayer coating film.

Also, if the polycarboxylic acid component among the monomer components is a trifunctional polycarboxylic acid component, a good multilayer coating film can be formed using the method for forming a coating film according to any one of methods I to V below.

<Method I>

A method for forming a coating film comprising steps (I) to (II) below performed on a target object:
  step (I) being a step in which the aqueous coating material composition proposed by the present invention is applied to form a colored coating film; and
  step (II) being a step in which the colored coating film is baked and cured.

<Method II>

A method for forming a multilayer coating film comprising steps (I) to (IV) below performed on a target object:
  step (I) being a step in which a first colored aqueous coating material is applied to form a first colored coating film;
  step (II) being a step in which a second colored aqueous coating material is applied on the cured or uncured first colored coating film formed in step (I) above, to form a second colored coating film;

step (III) being a step in which a clear coat is applied on the uncured second colored coating film formed in step (II) above, to form a clear coating film; and step (IV) being a step in which the multilayer coating film formed through steps (I) to (III) above is baked and cured;

wherein the first colored aqueous coating material is the aqueous coating material composition proposed by the present invention.

<Method III>

A method for forming a multilayer coating film comprising steps (I) to (IV) below performed on a target object:

step (I) being a step in which a first colored aqueous coating material is applied to form a first colored coating film;

step (II) being a step in which a second colored aqueous coating material is applied on the cured or uncured first colored coating film formed in step (I) above, to form a second colored coating film;

step (III) being a step in which a clear coat is applied on the uncured second colored coating film formed in step (II) above, to form a clear coating film; and step (IV) being a step in which the multilayer coating film formed through steps (I) to (III) above is baked and cured;

wherein the second colored aqueous coating material is the aqueous coating material composition proposed by the present invention.

<Method IV>

A method for forming a multilayer coating film comprising steps (I) to (III) below performed on a target object:

step (I) being a step in which a colored aqueous coating material is applied to form a colored coating film;

step (II) being a step in which a clear coat is applied on the uncured colored coating film formed in step (I) above, to form a clear coating film; and step (III) being a step in which the multilayer coating film formed through steps (I) and (II) above is baked and cured;

wherein the colored aqueous coating material is the aqueous coating material composition proposed by the present invention.

<Method V>

A method for forming a multilayer coating film comprising steps (I) to (V) below performed on a target object:

step (I) being a step in which a first colored aqueous coating material is applied to form a first colored coating film;

step (II) being a step in which a second colored aqueous coating material is applied on the cured or uncured first colored coating film formed in step (I) above, to form a second colored coating film;

step (III) being a step in which a third colored aqueous coating material is applied on the uncured second colored coating film formed in step (II) above, to form a third colored coating film;

step (IV) being a step in which a clear coat is applied on the uncured third colored coating film formed in step (III) above, to form a clear coating film; and step (V) being a step in which the multilayer coating film formed through steps (I) to (IV) above is baked and cured;

wherein the first colored aqueous coating material, second colored aqueous coating material, and/or third colored aqueous coating material is/are each the aqueous coating material composition proposed by the present invention.

Target Object

Under the method for forming a coating film proposed by the present invention, the target object that may have a cured or uncured coating film is not limited in any way, and may be, for example: an outer panel part of the automotive body of a passenger vehicle, truck, motorcycle, bus, etc.; a bumper or other automotive component; an outer panel part of a mobile phone, audio equipment, or other household appliance, etc. Among these, preferably it is an outer panel part of automotive body or automotive component.

The material of such target object is not limited in any way, and may be, for example: iron, aluminum, brass, copper, tin, stainless steel, galvanized steel, zinc alloy (Zn—Al, Zn—Ni, Zn—Fe, etc.)-plated steel, or other metal material; polyethylene resin, polypropylene resin, acrylonitrile-butadiene-styrene (ABS) resin, polyamide resin, acrylic resin, vinylidene chloride resin, polycarbonate resin, polyurethane resin, epoxy resin, or other resin or any of various other plastic materials such as FRP; glass, cement, concrete, or other inorganic material; wood; paper, fabric, or other fiber material, etc. Among these, preferably it is made of a metal material or plastic material.

The aforementioned target object may be a metal material as mentioned above, or automotive body, etc., formed therefrom, whose metal surface has been phosphatized, chromated, complex-oxide-treated, or otherwise treated, or further has a cured or uncured coating film formed on top.

The target object, if it has a cured or uncured coating film formed on it, may be an automotive body comprising a base material that has been surface-treated as necessary and has a coating film formed on top, such as a primer coating film formed by an electrodeposition coating material.

The target object may be a plastic material as mentioned above, or plastic surface of an automotive component, etc., formed therefrom, which has been surface-treated as necessary. Also, it may be a combination of a plastic material and a metal material.

EXAMPLES

The present invention is explained further using examples and comparative examples below.

For the methods for synthesizing various resins, methods for manufacturing coating material compositions, methods for forming coating films, evaluation/testing methods, etc., conventional methods known in the respective technical fields are used; however, the present invention is not limited to the foregoing and a number of modifications and variations are possible to the extent that they are equivalent in scope to the technical concepts of the present invention and the claims.

In each example, "part(s)" refers to part(s) by mass, while "%" refers to % by mass.

Manufacturing of Polyester Resins

Manufacturing Example 1

Into a reaction container equipped with a temperature gauge, a thermostat, an agitator, a reflux condenser and a water separator, 126 parts of trimesic acid, 1,365 parts of PTMG650 (polytetramethylene ether glycol, weight-average molecular weight 650), and 37 parts of glycerin were loaded, and then heated over 3 hours from 160° C. to 230° C., after which the materials were let undergo condensation reaction at 230° C. to an end-point acid value of 3 mgKOH/g. Next, 77 parts of trimellitic anhydride were added further and let react for 30 minutes at 170° C. to add carboxyl groups to the obtained condensation reaction product, after which 2-(dimethylamino)ethanol was added by 0.5 equivalents relative to the acid groups, and the result was further diluted with 2-ethyl-1-hexanol, to obtain a polyester resin (a-1) solution of 70% in solids content concentration. The obtained polyester resin had an acid value of 32 mgKOH/g, hydroxyl value of 117 mgKOH/g, solids content concentration of 70%, and number-average molecular weight of 1200.

Manufacturing Examples 2 to 16

Polyester resins (a-2) to (a-16) were synthesized in the same manner as in Manufacturing Example 1, except that the formulas shown in Table 1 below were used.

PPG600: Polypropylene glycol (weight-average molecular weight 600)

PTMG250: Polytetramethylene glycol (weight-average molecular weight 250)

PTMG650: Polytetramethylene glycol (weight-average molecular weight 650)

PTMG800: Polytetramethylene glycol (weight-average molecular weight 800)

PTMG2000: Polytetramethylene glycol (weight-average molecular weight 2,000)

TABLE 1

| Manufacturing example | | | 1 | 2 | 3 | 4 | 5 | 6 | 7 | 8 |
|---|---|---|---|---|---|---|---|---|---|---|
| Polyester resin name | | | a-1 | a-2 | a-3 | a-4 | a-5 | a-6 | a-7 | a-8 |
| Polybasic acid (a1) | Tetrafunctional | Pyromellitic anhydride | | | | 139.7 | | | | |
| | Trifunctional | Trimellitic anhydride | | 115.2 | 57.6 | | 115.2 | 115.2 | 115.2 | 115.2 |
| | | Trimesic acid | 126 | | 63 | | | | | |
| | Bifunctional | PA | | | | | | | | |
| Polyalcohol (a2) | Bifunctional | 16HD | | | | | | | | |
| | | PEG600 | | | | | | | | 1260 |
| | | PPG600 | | | | | | | 1260 | |
| | | PTMG250 | | | | | 500 | | | |
| | | PTMG650 | 1365 | 1365 | 1365 | 1365 | | | | |
| | | PTMG800 | | | | | | | | |
| | | PTMG2000 | | | | | | 4200 | | |
| | Trifunctional | Glycerin | 37 | 37 | 37 | 37 | 37 | 37 | 37 | 37 |
| Addition of carboxyl groups | | PA | | | | | | | | |
| | | Trimellitic anhydride | 77 | 77 | 77 | 77 | 77 | 77 | 77 | 77 |
| End-point acid value (mgKOH/g) | | | 3 | 3 | 3 | 3 | 3 | 7 | 3 | 3 |
| Acid value (mgKOH/g) | | | 32 | 32 | 32 | 32 | 67 | 18 | 34 | 34 |
| Hydroxyl value (mgKOH/g) | | | 117 | 117 | 117 | 103 | 241 | 43 | 126 | 126 |
| Number-average molecular weight (Mn) | | | 1200 | 1200 | 1200 | 1700 | 580 | 2900 | 1100 | 1100 |

| Manufacturing example | | | 9 | 10 | 11 | 12 | 13 | 14 | 15 | 16 |
|---|---|---|---|---|---|---|---|---|---|---|
| Polyester resin name | | | a-9 | a-10 | a-11 | a-12 | a-13 | a-14 | a-15 | a-16 |
| Polybasic acid (a1) | Tetrafunctional | Pyromellitic anhydride | | | | | | | | |
| | Trifunctional | Trimellitic anhydride | 115.2 | 115.2 | 115.2 | 115.2 | 115.2 | 115.2 | | |
| | | Trimesic acid | | | | | | | | |
| | Bifunctional | PA | | | | | | | 118.4 | 118.4 |
| Polyalcohol (a2) | Bifunctional | 16HD | 236 | | | 11.8 | | | | |
| | | PEG600 | | | | | | | | |
| | | PPG600 | | | | | | | | |
| | | PTMG250 | | | | | | | | |
| | | PTMG650 | | 1755 | 975 | 455 | 1365 | | 650 | 650 |
| | | PTMG800 | | | | | | 1680 | | |
| | | PTMG2000 | | | | | | | | |
| | Trifunctional | Glycerin | 37 | | 37 | 37 | 37 | 37 | | 37 |
| Addition of carboxyl groups | | PA | | | | | | | 59 | 59 |
| | | Trimellitic anhydride | 77 | 77 | 77 | 77 | 77 | 77 | | |
| End-point acid value (mgKOH/g) | | | 1 | 3 | 3 | 30 | 10 | 3 | 20 | 10 |
| Acid value (mgKOH/g) | | | 103 | 27 | 41 | 97 | 10 | 27 | 48 | 37 |
| Hydroxyl value (mgKOH/g) | | | 380 | 97 | 98 | 80 | 145 | 98 | 20 | 90 |
| Number-average molecular weight (Mn) | | | 370 | 1200 | 1600 | 1900 | 1000 | 1400 | 1700 | 1200 |

It should be noted that the abbreviations in the table above have the following meanings, respectively:

PA: Phthalic anhydride

16HD: 1,6-hexanediol

PEG600: Polyethylene glycol (weight-average molecular weight 600)

Manufacturing of Acrylic Resin Particles

Manufacturing Example 17

Into a reaction container equipped with a temperature gauge, a thermostat, an agitator, a reflux condenser, a nitrogen introduction tube, and a drip device, 120 parts of deionized water and 0.8 parts of "ADEKA REASOAP SR-1025" (product name, manufactured by ADEKA Corporation, emulsifier, active ingredient 25%) were loaded and mixed under agitation in nitrogen stream, and the mixture was heated to 80° C.

Next, the monomer emulsion for the core part described below in a quantity corresponding to 5% of the total quantity, and 2.5 parts of 6% aqueous solution of ammonium persulfate, were introduced into a reaction container and held for 15 minutes at 80° C. Thereafter, the remainder of the monomer emulsion for the core part was dripped over 3 hours into the reaction container held at the same temperature, and when the dripping was complete, the mixture was aged for 1 hour. Next, the monomer emulsion for the shell part described below was dripped over 1 hour, the mixture was aged for 1 hour and then cooled to 30° C. while 3.8 parts of 5% aqueous solution of 2-(dimethylamino)ethanol were gradually added to the reaction container, and the container was emptied through a 100-mesh nylon cloth for filtration, to obtain an acrylic resin particle dispersion (b-1) with an average particle size of 100 nm and solids content of 30%. The obtained acrylic resin particles had an acid value of 17.2 mgKOH/g and hydroxyl value of 27.2 mgKOH/g.

Monomer emulsion for the core part: 54 parts of deionized water, 3.1 parts of "ADEKA REASOAP SR-1025," 1 part of allyl methacrylate, 10 parts of styrene, 35 parts of n-butyl acrylate, 10 parts of methyl methacrylate, 20 parts of ethyl acrylate and 1 part of 2-hydroxyethyl methacrylate were mixed under agitation to obtain a monomer emulsion for core part.

Monomer emulsion for the shell part: 50 parts of deionized water, 1.8 parts of "ADEKA REASOAP SR-1025," 0.04 parts of ammonium persulfate, 5.3 parts of 2-hydroxyethyl acrylate, 2.6 parts of methacrylic acid, 8 parts of ethyl acrylate and 7.1 parts of methyl methacrylate were mixed under agitation to obtain a monomer emulsion for shell part.

Manufacturing Examples 18 to 20

Acrylic resin particle dispersions (b-2) to (b-4) were synthesized in the same manner as in Manufacturing Example 17, except that the formulas shown in Table 2 below were used.

Table 2 below shows the material compositions (parts), solids contents (%), acid values (mgKOH/g), and hydroxyl values (mgKOH/g) of the acrylic resin particle dispersions (b-1) to (b-4).

TABLE 2

| Manufacturing example | | | | 17 | 18 | 19 | 20 |
|---|---|---|---|---|---|---|---|
| Acrylic resin particle dispersion name | | | | b-1 | b-2 | b-3 | b-4 |
| Deionized water | | | | 120 | 120 | 120 | 120 |
| ADEKA REASOAP SR-1025 | | | | 0.8 | 0.8 | 0.8 | 0.8 |
| 6% aqueous solution of ammonium persulfate | | | | 2.5 | 2.5 | 2.5 | 2.5 |
| Monomer emulsion for core part | Deionized water | | | 54 | 54 | 54 | 104 |
| | ADEKA REASOAP SR-1025 | | | 3.1 | 3.1 | 3.1 | 4.9 |
| | Polymerizable unsaturated monomer having two or more polymerizable unsaturated groups in one molecule | AMA | | 1 | 1 | | |
| | Polymerizable unsaturated monomers with 4 or more carbon atoms | St | | 10 | | 10 | 10 |
| | | nBA | | 35 | | 36 | 33 |
| | Hydroxyl group-containing polymerizable unsaturated monomer | HEMA | | 1 | 1 | 1 | 6.3 |
| | Carboxyl group-containing polymerizable unsaturated monomer | MAAc | | | | | 2.6 |
| | Other monomers | MMA | | 10 | 45 | 10 | 18.1 |
| | | EA | | 20 | 30 | 20 | 30 |
| Monomer emulsion for shell part | Deionized water | | | 50 | 50 | 50 | |
| | ADEKA REASOAP SR-1025 | | | 1.8 | 1.8 | 1.8 | |
| | 6% aqueous solution of ammonium persulfate | | | 0.04 | 0.04 | 0.04 | |
| | Hydroxyl group-containing polymerizable unsaturated monomer | HEMA | | 5.3 | 5.3 | 5.3 | |
| | Carboxyl group-containing polymerizable unsaturated monomer | MAAc | | 2.6 | 2.6 | 2.6 | |
| | Other monomers | MMA | | 7.1 | 7.1 | 7.1 | |
| | | EA | | 8 | 8 | 8 | |
| 5% aqueous solution of 2-(dimethylamino)ethanol | | | | 3.8 | 3.8 | 3.8 | 3.8 |
| Solids content (%) | | | | 30 | 30 | 30 | 30 |
| Acid value (mgKOH/g) | | | | 17.2 | 17.2 | 17.2 | 17.2 |
| Hydroxyl value (mgKOH/g) | | | | 27.2 | 27.2 | 27.2 | 27.2 |

It should be noted that the abbreviations in the table above have the following meanings, respectively:

AMA: Allyl methacrylate
St: Styrene
nBA: n-butyl acrylate
HEMA: 2-hydroxyethyl methacrylate
MAAc: Methacrylic acid
MMA: Methyl methacrylate
EA: Ethyl acrylate Manufacturing of Active Methylene Type Block Polyisocyanate Compound Manufacturing Example 21

Into a reaction container equipped with a temperature gauge, a thermostat, an agitator, a reflux condenser, a nitrogen introduction tube, a drip device, and a simple trap for removed medium, 360 parts of "SUMIDUR N-3300," 60 parts of "UNIOX M-550" (manufactured by NOF Corporation, polyethylene glycol monomethyl ether, average molecular weight approx. 550) and 0.2 parts of 2,6-di-tert-butyl-4-methylphenol were loaded, mixed well, and heated for 3 hours at 130° C. in nitrogen stream. Next, 110 parts of ethyl acetate and 252 parts of diisopropyl malonate were loaded, and after having added 3 parts of 28% methanol solution of sodium methoxide under agitation in nitrogen stream, the mixture was agitated for 8 hours at 65° C. The isocyanate quantity in the obtained resin solution was 0.12 mol/Kg. To this, 683 parts of 4-methyl-2-pentanol were added and the solvent was distilled away over 3 hours under a decompression condition with the system temperature held at 80 to 85° C., to obtain 1,010 parts of an active methylene type block polyisocyanate compound solution. The simple trap for removed medium had contained 95 parts of isopropanol. The solids content concentration of the obtained active methylene type block polyisocyanate compound solution was approx. 60%.

Phosphoric Acid Group-Containing Dispersed Resin

Manufacturing Example 22

Into a reaction container equipped with a temperature gauge, a thermostat, an agitator, a reflux condenser, a nitrogen introduction tube, and a drip device, a mixed solvent constituted by 27.5 parts of methoxypropanol and 27.5 parts of isobutanol was introduced and heated to 110° C., after which 121.5 parts of a mixture constituted by 25 parts of styrene, 27.5 parts of n-butyl methacrylate, 20 parts of "ISOSTEARYL ACRYLATE" (product name, manufactured by Osaka Organic Chemical Industry Ltd., branched higher alkyl acrylate), 7.5 parts of 4-hydroxybutyl acrylate, 15 parts of phosphoric acid group-containing polymerizable unsaturated monomer (Note 1), 12.5 parts of 2-methacryloyloxyethyl acid phosphate, 10 parts of isobutanol, and 4 parts of t-butyl peroxyoctanoate were added to the aforementioned mixed solvent over 4 hours, and a mixture constituted by 0.5 parts of t-butyl peroxyoctanoate and 20 parts of isopropanol was further dripped over 1 hour. Thereafter, the mixture was aged under agitation for 1 hour, to obtain a phosphoric acid group-containing dispersed resin solution of 50% in solids content concentration. This resin had an acid value due to phosphoric acid groups of 83 mgKOH/g, hydroxyl value of 29 mgKOH/g, and weight-average molecular weight of 10,000.

(Note 1) Phosphoric acid group-containing polymerizable unsaturated monomer: Into a reaction container equipped with a temperature gauge, a thermostat, an agitator, a reflux condenser, a nitrogen introduction tube, and a drip device, 57.5 parts of monobutyl phosphoric acid and 41 parts of isobutanol were introduced and heated to 90° C., after which 42.5 parts of glycidyl methacrylate were dripped over 2 hours and the mixture was aged further under agitation for 1 hour. Thereafter, 59 parts of isopropanol were added, to obtain a phosphoric acid group-containing polymerizable unsaturated monomer solution of 50% in solids content concentration. The obtained monomer had an acid value due to phosphoric acid groups of 285 mgKOH/g.

Manufacturing of Photoluminescent Pigment Dispersion

An agitation mixing container, 19 parts of aluminum pigment paste "GX-180A" (product name, manufactured by Asahi Kasei Metals Corporation, metal content 74%), 34.8 parts of 2-ethyl-1-hexanol, 8 parts of the phosphoric acid group-containing dispersed resin solution obtained in Manufacturing Example 22, and 0.2 parts of 2-(dimethylamino) ethanol, were mixed uniformly, to obtain a photoluminescent pigment dispersion.

Aqueous Coating Material Compositions

Example 1

21.4 parts (15 parts in solids content) of the polyester resin (a-1) solution manufactured in Manufacturing Example 1, 100 parts (30 parts in solids content) of the acrylic resin particle dispersion (b-1) obtained in Manufacturing Example 17, 20 parts (20 parts in solids content) of melamine resin "CYMEL 350" (product name, manufactured by Mitsui Cytec, Ltd., methyl-etherified melamine resin, weight-average molecular weight 550, solids content 100%), 16.67 parts (10 parts in solids content) of the active methylene type block polyisocyanate compound obtained in Manufacturing Example 21, 57.1 parts (20 parts in solids content) of urethane resin "UCOAT UX-8100" (product name, manufactured by Sanyo Chemical Industries, Ltd., urethane resin, solids content 35%), 1 part (1 part in solids content) of polyether polyol "SANNIX PP-600" (product name, manufactured by Sanyo Chemical Industries, Ltd., polypropylene glycol, molecular weight 1,000), and 62 parts (4 parts in solids content of resin) of the photoluminescent pigment dispersion obtained in Manufacturing Example 23, were mixed uniformly, after which "PRIMAL ASE-60" (product name, manufactured by Rohm and Haas Co., polyacrylic acid-based thickening agent), 2-(dimethylamino)ethanol, and deionized water were added further, to obtain an aqueous coating material composition (X-1) of pH 8.0, 48% in solids content concentration, and 60 seconds in Ford Cup No. 4 viscosity at 20° C.

Examples 2 to 26, Comparative Examples 1 to 4

Aqueous coating material compositions (X-2) to (X-30) were obtained in the same manner as the aqueous coating material composition (X-1) in Example 1 was obtained, except that the coating material formulas shown in Table 3 below were used.

Example 27

20 parts (10 parts in solids content) of the phosphoric acid group-containing dispersed resin solution obtained in Manufacturing Example 22, 60 parts of "JR-806" (product name, manufactured by TAYCA Corporation, rutile type titanium dioxide), 16 parts of "BARIACE B-35" (product name, manufactured by Sakai Chemical Industry Co., Ltd., barium sulfate powder, average primary particle size 0.5 μm), 3 parts of "MICRO ACE S-3" (product name, manufactured by Nippon Talc Co., Ltd., talc powder, average primary particle size 4.8 μm), and 46 parts of deionized water were mixed and the pH was adjusted to 8.0 using 2-(dimethylamino)ethanol, after which the mixture was dispersed for 30 minutes using a paint shaker, to obtain a pigment dispersed paste.

Next, 145 parts (10 parts in solids content of resin) of the obtained pigment dispersed paste, 100 parts (30 parts in solids content) of the acrylic resin particle dispersion (b-1) obtained in Manufacturing Example 17, 28.6 parts (20 parts in solids content) of the polyester resin (a-1) solution obtained in Manufacturing Example 1, 28.6 parts (10 parts in solids content) of "UCOAT UX-8100" (product name, manufactured by Sanyo Chemical Industries, Ltd., urethane emulsion, solids content 35%), 33.3 parts (15 parts in solids content) of the active methylene type block polyisocyanate compound solution obtained in Manufacturing Example 21, 15 parts (15 parts in solids content) of melamine resin "CYMEL 350" (product name, manufactured by Mitsui Cytec, Ltd., methyl-etherified melamine resin, weight-average molecular weight 550, solids content 100%) and 10 parts of 2-ethyl-1-hexanol were mixed uniformly.

Next, "UH-752" (product name, manufactured by ADEKA Corporation, urethane association-type thickening agent), 2-(dimethylamino)ethanol, and deionized water were added to the obtained mixture, to obtain an aqueous coating material composition (X-31) of pH 8.0, 48% in solids content concentration, and 30 seconds in Ford Cup No. 4 viscosity at 20° C.

Example 28

21.4 parts (15 parts in solids content) of the polyester resin (a-1) solution manufactured in Manufacturing Example 1, 100 parts (30 parts in solids content) of the acrylic resin particle dispersion (b-1) obtained in Manufacturing Example 17, 20 parts (20 parts in solids content) of melamine resin "CYMEL 350" (product name, manufactured by Mitsui Cytec, Ltd., methyl-etherified melamine resin, weight-average molecular weight 550, solids content 100%), 16.67 parts (10 parts in solids content) of the active methylene type block polyisocyanate compound obtained in Manufacturing Example 21, 57.1 parts (20 parts in solids content) of urethane resin "UCOAT UX-8100" (product name, manufactured by Sanyo Chemical Industries, Ltd., urethane resin, solids content 35%), 1 part (1 part in solids content) of polyether polyol "SANNIX PP-600" (product name, manufactured by Sanyo Chemical Industries, Ltd., polypropylene glycol, molecular weight 600), and 18 parts (4 parts in solids content of resin) of a pearl pigment dispersion (Note 2), were mixed uniformly, after which "PRIMAL ASE-60" (product name, manufactured by Rohm and Haas Co., polyacrylic acid-based thickening agent), 2-(dimethylamino)ethanol, and deionized water were added further, to obtain an aqueous coating material composition (X-32) of pH 8.0, 48% in solids content concentration, and 60 seconds in Ford Cup No. 4 viscosity at 20° C.

(Note 2) Pearl pigment dispersion: 8 parts (4 parts in solids content of resin) of the phosphoric acid group-containing dispersed resin obtained in Manufacturing Example 22 and 10 parts of titanium oxide-coated scaly mica pigment "IRIODIN 103W" (product name, maximum diameter 10 to 20 μm, thickness 0.5 to 1 μm) were mixed uniformly, to obtain a pearl pigment dispersion.

Example 29

20 parts (10 parts in solids content) of the phosphoric acid group-containing dispersed resin solution obtained in Manufacturing Example 22, 59 parts of "JR-806" (product name, manufactured by TAYCA Corporation, rutile type titanium dioxide), 1 part of "Carbon MA 100" (product name, manufactured by Mitsubishi Chemical Corporation, carbon black), 16 parts of "BARIACE B-35" (product name, manufactured by Sakai Chemical Industry Co., Ltd., barium sulfate powder, average primary particle size 0.5 μm), 3 parts of "MICRO ACE S-3" (product name, manufactured by Nippon Talc Co., Ltd., talc powder, average primary particle size 4.8 μm), and 46 parts of deionized water were mixed and the pH was adjusted to 8.0 using 2-(dimethylamino)ethanol, after which the mixture was dispersed for 30 minutes using a paint shaker, to obtain a pigment dispersed paste.

Next, 145 parts (10 parts in solids content of resin) of the obtained pigment dispersed paste, 100 parts (30 parts in solids content) of the acrylic resin particle dispersion (b-1) obtained in Manufacturing Example 17, 28.6 parts (20 parts in solids content) of the polyester resin (a-1) solution obtained in Manufacturing Example 1, 28.6 parts (10 parts in solids content) of "UCOAT UX-8100" (product name, manufactured by Sanyo Chemical Industries, Ltd., urethane emulsion, solids content 35%), 33.3 parts (15 parts in solids content) of the active methylene type block polyisocyanate compound solution obtained in Manufacturing Example 21, 15 parts (15 parts in solids content) of melamine resin "CYMEL 350" (product name, manufactured by Mitsui Cytec, Ltd., methyl-etherified melamine resin, weight-average molecular weight 550, solids content 100%), and 10 parts of 2-ethyl-1-hexanol were mixed uniformly.

Next, "UH-752" (product name, manufactured by ADEKA Corporation, urethane association-type thickening agent), 2-(dimethylamino)ethanol, and deionized water were added to the obtained mixture, to obtain an aqueous coating material composition (X-33) of pH 8.0, 48% in solids content concentration and 30 seconds in Ford Cup No. 4 viscosity at 20° C.

TABLE 3

| Examples/Comparative Examples | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | Comp 1 | Comp 2 | Comp 3 | Comp 4 |
|---|---|---|---|---|---|---|---|---|---|---|---|---|---|---|---|---|---|---|---|---|---|---|---|---|---|---|---|---|---|---|---|
| Aqueous coating material composition name | | X-1 | X-2 | X-3 | X-4 | X-5 | X-6 | X-7 | X-8 | X-9 | X-10 | X-11 | X-12 | X-13 | X-14 | X-15 | X-16 | X-17 | X-18 | X-19 | X-20 | X-21 | X-22 | X-23 | X-24 | X-25 | X-26 | X-27 | X-28 | X-29 | X-30 |
| (A) | Polyester resin (a-1) | 15 | | | | | | | | | | | | | | 15 | 15 | 15 | 20 | 15 | 15 | 15 | 15 | 15 | 15 | 15 | 15 | | | | 35 |
| | Polyester resin (a-2) | | 15 | | | | | | | | | | | | | | | | | | | | | | | | | | | | |
| | Polyester resin (a-3) | | | 15 | | | | | | | | | | | | | | | | | | | | | | | | | | | |
| | Polyester resin (a-4) | | | | 15 | | | | | | | | | | | | | | | | | | | | | | | | | | |
| | Polyester resin (a-5) | | | | | 15 | | | | | | | | | | | | | | | | | | | | | | | | | |
| | Polyester resin (a-6) | | | | | | 15 | | | | | | | | | | | | | | | | | | | | | | | | |
| | Polyester resin (a-7) | | | | | | | 15 | | | | | | | | | | | | | | | | | | | | | | | |
| | Polyester resin (a-8) | | | | | | | | 15 | | | | | | | | | | | | | | | | | | | | | | |
| | Polyester resin (a-9) | | | | | | | | | 15 | | | | | | | | | | | | | | | | | | | | | |
| | Polyester resin (a-10) | | | | | | | | | | 15 | | | | | | | | | | | | | | | | | | | | |
| | Polyester resin (a-11) | | | | | | | | | | | 15 | | | | | | | | | | | | | | | | | | | |
| | Polyester resin (a-12) | | | | | | | | | | | | 15 | | | | | | | | | | | | | | | | | | |
| | Polyester resin (a-13) | | | | | | | | | | | | | 15 | | | | | | | | | | | | | | | | | |
| | Polyester resin (a-14) | | | | | | | | | | | | | | 15 | | | | | | | | | | | | | | | | |
| | Polyester resin (a-15) | | | | | | | | | | | | | | | | | | | | | | | | | | | 15 | | | |
| | Polyester resin (a-16) | | | | | | | | | | | | | | | | | | | | | | | | | | | | 15 | | |
| (B) | Acrylic resin particles (b-1) | 30 | 30 | 30 | 30 | 30 | 30 | 30 | 30 | 30 | 30 | 30 | 30 | 30 | 30 | 28 | 25 | 31 | 45 | | | | | 30 | 30 | 30 | 30 | 30 | 30 | 45 | |
| | Acrylic resin particles (b-2) | | | | | | | | | | | | | | | | | | | 30 | 30 | | | | | | | | | | |
| | Acrylic resin particles (b-3) | | | | | | | | | | | | | | | | | | | | | 30 | | | | | | | | | |
| | Acrylic resin particles (b-4) | | | | | | | | | | | | | | | | | | | | | | 30 | | | | | | | | |
| (C) | Melamine resin (Note 3) | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 |
| | Block polyisocyanate compound | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 |
| (E) | Urethane resin (Note 4) | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 |
| (F) | Polyether polyol 1 (Note 5) | 1 | 1 | 1 | 1 | 1 | 1 | 1 | 1 | 1 | 1 | 1 | 1 | 1 | 1 | 3 | 6 | 3 | 1 | 1 | 1 | 1 | 1 | 1 | 1 | 1 | 1 | 1 | 1 | 1 | 1 |
| | Polyether polyol 2 (Note 6) | | | | | | | | | | | | | | | | | 3 | | | | | | | | | | | | | |

It should be noted that the compounding quantities in the table above represent values in solids content.

(Note 3) Melamine resin: "CYMEL 325" (product name, manufactured by Mitsui Cytec, Ltd., methyl-etherified melamine resin, weight-average molecular weight 550, solids content 100%)

(Note 4) Urethane resin: "UCOAT UX-8100" (product name, manufactured by Sanyo Chemical Industries, Ltd., urethane resin, solids content 35%)

(Note 5) Polyether polyol 1: "SANNIX PP-600" (product name, manufactured by Sanyo Chemical Industries, Ltd., polypropylene glycol, molecular weight 600)

(Note 6) Polyether polyol 2: "SANNIX PP-2000" (product name, manufactured by Sanyo Chemical Industries, Ltd., polypropylene glycol, molecular weight 2,000)

Method for Forming Multilayer Coating Film
(Preparation of Test Target Object)

On a zinc-phosphate-treated cold-rolled steel sheet, Elecron GT-10 (product name, manufactured by Kansai Paint Co., Ltd., cationic electrodeposition coating material) was applied by means of electrodeposition to a dry film thickness of 20 μm, after which the steel sheet was heated at 170° C. for 30 minutes and cured, for use as a test target object.

Example 30

On the aforementioned test target object, aqueous middle coat "WP-522H" (product name, manufactured by Kansai Paint Co., Ltd., polyester resin/amino resin-based aqueous middle coat) was applied electrostatically to a cured film thickness of 30 μm using a rotary-atomization type electrostatic coater, after which the test target object was let stand for 5 minutes and then preheated at 80° C. for 5 minutes. Subsequently, the aqueous coating material composition (X-1) obtained in Example 1 was applied electrostatically to a cured film thickness of 15 μm using a rotary-atomization type electrostatic coater, to form an uncured photoluminescent coating film. It was let stand for 3 minutes, and then preheated at 80° C. for 3 minutes, after which clear coat "Magicron KINO-1210" (product name, manufactured by Kansai Paint Co., Ltd., acid/epoxy-curable type acrylic resin-based organic solvent type top clear coat) was applied electrostatically to a cured film thickness of 35 μm. After having been let stand for 7 minutes, the aforementioned target object (test target object having an uncured middle coating film, photoluminescent coating film, and clear coating film thereon) was heated, thereby conducting simultaneous film baking, at 140° C. for 30 minutes, to obtain a test coated sheet (Y-1) to which the method for forming a multilayer coating film according to method III above was applied.

Examples 31 to 51, Comparative Examples 5 to 8

Test coated sheets (Y-2) to (Y-22) and test coated sheets (Y-27) to (Y-30) were obtained in the same manner as the method for forming a multilayer coating film in Example 30 (method III above), except that the coating material compositions in Table 4 below were used.

Example 52

On the aforementioned test target object, a middle coat (product name "TP-65," manufactured by Kansai Paint Co., Ltd., polyester resin/amino resin-based organic solvent type coating material composition) was applied to a cured film thickness of 25 μm, after which the test target object was let stand for 5 minutes and then preheated at 80° C. for 5 minutes, and cured at 140° C. for 30 minutes. Subsequently, the aqueous coating material composition (X-23) obtained in Example 23 was applied electrostatically to a cured film thickness of 15 μm using a rotary-atomization type electrostatic coater, to form an uncured photoluminescent coating film. It was let stand for 3 minutes, and then preheated at 80° C. for 3 minutes, after which clear coat "Magicron KINO-1210" (product name, manufactured by Kansai Paint Co., Ltd., acid/epoxy-curable type acrylic resin-based organic solvent type top clear coat) was applied electrostatically on the aforementioned target object having an uncured photoluminescent coating film, to a cured film thickness of 35 μm. After having been let stand for 7 minutes, the aforementioned target object (test target object having a cured middle coating film, an uncured photoluminescent coating film, and an uncured clear coating film thereon) was heated, and baked at the same time, at 140° C. for 30 minutes, to obtain a test coated sheet (Y-23) to which the method for forming a multilayer coating film according to method IV above was applied.

Example 53

On the aforementioned test target object, the aqueous coating material composition (X-33) obtained in Example 29 was applied electrostatically to a cured film thickness of 30 μm using a rotary-atomization type electrostatic coater, after which the test target object was let stand for 5 minutes and then preheated at 80° C. for 5 minutes. Subsequently, the aqueous coating material composition (X-24) obtained in Example 24 was applied electrostatically to a cured film thickness of 15 μm using a rotary-atomization type electrostatic coater. It was let stand for 3 minutes, and then preheated at 80° C. for 3 minutes, after which clear coat "Magicron KINO-1210" (product name, manufactured by Kansai Paint Co., Ltd., acid/epoxy-curable type acrylic resin-based organic solvent type top clear coat) was applied electrostatically to a cured film thickness of 35 μm. After having been let stand for 7 minutes, the aforementioned target object (test target object having an uncured middle coating film, an uncured photoluminescent coating film, and an uncured clear coating film thereon) was heated, and baked at the same time, at 140° C. for 30 minutes, to obtain a test coated sheet (Y-24) to which the method for forming a multilayer coating film according to method II above was applied.

Example 54

On the aforementioned test target object, the aqueous coating material composition (X-33) obtained in Example 29 was applied electrostatically to a cured film thickness of 30 μm using a rotary-atomization type electrostatic coater, after which the test target object was let stand for 5 minutes and then preheated at 80° C. for 5 minutes. Subsequently, the aqueous coating material composition (X-31) obtained in Example 27 was applied electrostatically to a cured film thickness of 30 μm using a rotary-atomization type electrostatic coater, after which the test target object was let stand for 5 minutes and then preheated at 80° C. for 5 minutes. Subsequently, the aqueous coating material composition (X-32) obtained in Example 28 was applied electrostatically to a cured film thickness of 15 μm using a rotary-atomization type electrostatic coater. It was let stand for 3 minutes and then preheated at 80° C. for 3 minutes, after which clear coat "Magicron KINO-1210" (product name, manufactured by Kansai Paint Co., Ltd., acid/epoxy-curable type acrylic resin-based organic solvent type top clear coat) was applied electrostatically to a cured film thickness of 35 μm. After having been let stand for 7 minutes, the aforementioned target object (test target object having an uncured middle coating film, an uncured white coating film, an uncured pearl coating film, and an uncured clear coating film thereon) was heated, and baked at the same time, at 140° C. for 30 minutes, to obtain a test coated sheet (Y-25) to which the method for forming a multilayer coating film according to method V above was applied.

Example 55

On the aforementioned test target object, the aqueous coating material composition (X-26) obtained in Example 26 was applied electrostatically to a cured film thickness of 45 μm using a rotary-atomization type electrostatic coater, to form an uncured photoluminescent coating film. It was let stand for 3 minutes and then preheated at 80° C. for 3 minutes, after which clear coat "Magicron KINO-1210" (product name, manufactured by Kansai Paint Co., Ltd., acid/epoxy-curable type acrylic resin-based organic solvent type top clear coat) was applied electrostatically on the aforementioned target object having an uncured photoluminescent coating film, to a cured film thickness of 35 μm. After having been let stand for 7 minutes, the aforementioned target object (test target object having an uncured photoluminescent coating film and an uncured clear coating film thereon) was heated, and baked at the same time, at 140° C. for 30 minutes, to obtain a test coated sheet (Y-26) to which the method for forming a multilayer coating film according to method IV above was applied.

The evaluation tests (on smoothness, clarity, flip-flop property, and water resistance) were conducted, according to the methods described below, on the test coated sheets (Y-1) to (Y-30) obtained in Examples 30 to 55 and Comparative Examples 5 to 8. It should be noted that, under the present invention, it is important that all of the properties in smoothness, clarity, flip-flop property, and water resistance are excellent, and therefore a failing grade "C" on any one of them results in rejection. The evaluation results are shown together in Table 4 above. Also, the test coated sheet (Y-25) in Example 54 was not evaluated for flip-flop property because it had a white pearl color.

Additionally, the test coated sheets obtained by methods other than method III were not evaluated for water resistance.

<Smoothness>

The test coated sheets were evaluated based on the value of Wc measured with the "Wave Scan DOI" (product name, manufactured by BYK Gardner GmbH). It should be noted that the smaller the value of Wc, the higher the smoothness of the coated surface. Among the grades, S to B indicate acceptable, while C indicates rejected.

S: The value of Wc is under 7, indicating superior smoothness.
A: The value of Wc is 7 or greater but under 8.5, indicating excellent smoothness.
B: The value of Wc is 8.5 or greater but under 10, indicating somewhat poor smoothness.
C: The value of Wc is 10 or greater, indicating poor smoothness.

<Clarity>

The test coated sheets were evaluated based on the value of Wa measured with the "Wave Scan DOI" (product name,

TABLE 4

| Examples/Comparative Examples | Examples | | | | | | | | | | | | | | | | | | |
|---|---|---|---|---|---|---|---|---|---|---|---|---|---|---|---|---|---|---|---|
| | 30 | 31 | 32 | 33 | 34 | 35 | 36 | 37 | 38 | 39 | 40 | 41 | 42 | 43 | 44 | 45 | 46 | 47 | 48 |
| Test coated sheet name | Y-1 | Y-2 | Y-3 | Y-4 | Y-5 | Y-6 | Y-7 | Y-8 | Y-9 | Y-10 | Y-11 | Y-12 | Y-13 | Y-14 | Y-15 | Y-16 | Y-17 | Y-18 | Y-19 |
| Aqueous coating material composition name | X-1 | X-2 | X-3 | X-4 | X-5 | X-6 | X-7 | X-8 | X-9 | X-10 | X-11 | X-12 | X-13 | X-14 | X-15 | X-16 | X-17 | X-18 | X-19 |
| Method for forming a multilayer coating film | III | III | III | III | III | III | III | III | III | III | III | III | III | III | III | III | III | III | III |
| Evaluation Smoothness | S | S | S | A | A | S | A | A | B | B | B | B | B | S | S | S | S | S | A |
| Clarity | S | S | S | A | A | S | A | B | B | A | A | B | A | S | S | S | S | S | A |
| Flip-flop property (FF property) | S | S | S | A | B | S | B | B | B | B | B | B | B | S | S | S | S | A | A |
| Water resistance | S | S | S | S | S | B | A | B | S | S | S | S | S | A | S | B | A | S | A |

| Examples/Comparative Examples | Examples | | | | | | | Comparative Examples | | | |
|---|---|---|---|---|---|---|---|---|---|---|---|
| Examples | 49 | 50 | 51 | 52 | 53 | 54 | 55 | 5 | 6 | 7 | 8 |
| Test coated sheet name | Y-20 | Y-21 | Y-22 | Y-23 | Y-24 | Y-25 | Y-26 | Y-27 | Y-28 | Y-29 | Y-30 |
| Aqueous coating material composition name | X-20 | X-21 | X-22 | X-23 | X-33/24 | X-33/31/32 | X-26 | X-27 | X-28 | X-29 | X-30 |
| Method for forming a multilayer coating film | III | III | III | IV | II and III | V | IV | III | III | III | III |
| Evaluation Smoothness | A | A | B | S | S | S | S | B | B | C | C |
| Clarity | A | A | A | S | S | S | S | C | B | C | C |
| Flip-flop property (FF property) | A | A | B | S | S | — | S | C | C | C | C |
| Water resistance | A | B | B | — | — | — | — | S | S | S | C | manufactured by BYK Gardner GmbH). It should be noted that the smaller the value of Wa, the higher the clarity of the coated surface. Among the grades, S to B indicate acceptable, while C indicates rejected.

S: The value of Wa is under 8, indicating superior clarity.
A: The value of Wa is 8 or greater but under 10, indicating excellent clarity.
B: The value of Wa is 10 or greater but under 12, indicating somewhat poor clarity.
C: The value of Wa is 12 or greater, indicating poor clarity.

<Flip-Flop Property (FF Property)>

The test coated sheets were evaluated based on the FF value derived from the L value (brightness) measured with the "multi-angle spectrocolorimeter MA-68" (product name, manufactured by X-Rite, Incorporated). It should be noted that the FF value was obtained according to the formula below:

$$FF\ value = L\ \text{value at 15-degree light-receiving angle} / L\ \text{value at 110-degree light-receiving angle}$$

The greater the FF value, the greater the change in L value (brightness) due to the observation angle (light-receiving angle), indicating excellent flip-flop property. Among the grades, S to B indicate acceptable, while C indicates rejected.

S: The FF value is 5.5 or greater, indicating superior flip-flop property.
A: The FF value is 4.8 or greater but under 5.5, indicating excellent flip-flop property.
B: The FF value is 4 or greater but under 4.8, indicating somewhat poor flip-flop property.
C: The FF value is under 4, indicating poor flip-flop property.

<Water Resistance>

The test sheets were soaked in 40° C. hot water for 240 hours, and then pulled out and dried at 20° C. for 12 hours, after which lattice cuts reaching the base material were made into the multilayer coating film on each test sheet using a cutting knife, to create 100 squares of 2 mm x 2 mm in size. Subsequently, a piece of adhesive cellophane tape was stuck on the surface and then rapidly peeled at 20° C., after which the condition of the remaining coating film squares was examined. Among the grades, S to B indicate acceptable, while C indicates rejected.

S: 100 coating film squares remained, and the coating film had no minor chips along the edges of the cuts made with the cutting knife.
A: 100 coating film squares remained, but the coating film had minor chips along the edges of the cuts made with the cutting knife.
B: 90 to 99 coating film squares remained.
C: The number of remaining coating film squares was 89 or smaller.

What is claimed is:

1. An aqueous coating material composition containing a polyester resin (A), acrylic resin particles (B), a curing agent (C), and a coloring pigment (D), the aqueous coating material composition characterized in that the polyester resin (A) is a resin containing a trifunctional or higher polyfunctional polycarboxylic acid (a1) and a polyol (a2) as monomer components, wherein the polyol (a2) is a polyalkylene glycol (a2-1) expressed by Formula (I) below:

HO—(X—O—)n-H     (1)

in the Formula (1), X is a straight-chain or branched hydrocarbon group with 4 carbon atoms, wherein n is a value such that a weight-average molecular weight of the polyalkylene glycol (a2-1) is 100 or greater but 5000 or smaller, the acrylic resin particles (B) are core-shell type acrylic resin particles (B1) each having a core part and a shell part, wherein a ratio of core parts and shell parts falls in a range of 50/50 to 90/10 based on a total quantity of monomer components, and the core parts contain, relative to a total quantity of monomer components of the core parts, 1 to 10% by mass of polymerizable unsaturated monomers having two or more polymerizable unsaturated groups in one molecule, and the composition further contains a polyether polyol (F).

2. The aqueous coating material composition according to claim 1, characterized in that the curing agent (C) is an amino resin and/or block polyisocyanate compound.

3. The aqueous coating material composition according to claim 1, characterized in that the coloring pigment (D) contains a photoluminescent pigment.

4. The aqueous coating material composition according to claim 1, characterized by further containing a urethane resin (E).

* * * * *